US008825490B1

(12) United States Patent
Weinstein

(10) Patent No.: US 8,825,490 B1
(45) Date of Patent: Sep. 2, 2014

(54) SYSTEMS AND METHODS FOR USER-SPECIFICATION AND SHARING OF BACKGROUND SOUND FOR DIGITAL TEXT READING AND FOR BACKGROUND PLAYING OF USER-SPECIFIED BACKGROUND SOUND DURING DIGITAL TEXT READING

(75) Inventor: Phil I. Weinstein, Burbank, CA (US)

(73) Assignee: Phil Weinstein, Burbank, CA (US)

( * ) Notice: Subject to any disclaimer, the term of this patent is extended or adjusted under 35 U.S.C. 154(b) by 52 days.

(21) Appl. No.: 13/325,351

(22) Filed: Dec. 14, 2011

Related U.S. Application Data

(63) Continuation-in-part of application No. 12/927,145, filed on Nov. 8, 2010.

(60) Provisional application No. 61/280,736, filed on Nov. 9, 2009.

(51) Int. Cl.
*G06F 17/30* (2006.01)
(52) U.S. Cl.
CPC ................ *G06F 17/3074* (2013.01)
USPC ....................................... 704/270
(58) Field of Classification Search
CPC .................................. G06F 17/3074
USPC ............................................ 704/270
See application file for complete search history.

(56) References Cited

U.S. PATENT DOCUMENTS

| | | | | |
|---|---|---|---|---|
| 6,370,497 | B1 * | 4/2002 | Knowles | 704/1 |
| 7,663,628 | B2 * | 2/2010 | Cederwall et al. | 345/473 |
| 8,209,385 | B2 * | 6/2012 | Partaker et al. | 709/206 |
| 8,346,798 | B2 * | 1/2013 | Spiegelman et al. | 707/770 |
| 2003/0200858 | A1 | 10/2003 | Xie | |
| 2005/0144002 | A1 * | 6/2005 | Ps | 704/266 |
| 2009/0222117 | A1 * | 9/2009 | Kaplan et al. | 700/94 |
| 2011/0153047 | A1 * | 6/2011 | Cameron et al. | 700/94 |

OTHER PUBLICATIONS

"Booktrack Soundtracks for Books," http//www.booktrack.com, © 2011, printed Sep. 7, 2011, 1 page.
"Booktrack Soundtracks for Books About," http//www.booktrack.com/about.do, © 2011, printed Sep. 7, 2011, 1 page.

* cited by examiner

*Primary Examiner* — Susan McFadden

(57) ABSTRACT

Exemplary embodiments of the present invention would provide an exemplary coordinated music identification playlist editor with which a user (sometimes referred to herein as a playlist editor user, a playlist programmer, a charted playlist creator, or a charted-playlist-creator-user) would identify music selections (in the form of a customized playlist, or simply, a playlist) for coordinated playback that would be synchronized with a later reading by a reading user of a particular digital text file. Exemplary embodiments would further facilitate a reading user's selection of a particular playlist for coordinated playback that would be synchronized with the reading user's reading of the particular digital text file. Exemplary embodiments of the present invention would provide exemplary computer systems and methods that would facilitate a sharing across a reading community of charted playbacks of music picks for readings of digital works.

16 Claims, 28 Drawing Sheets

Title selected:
Harry Potter
Year published: 2004
Genre: Fantasy

Like watching a movie, there will
be natural breaks in the music
as you read.

Title selected:
Harry Potter
Year published: 2004
Genre: Fantasy

Like watching a movie, there will
be natural breaks in the music
as you read.

SYSTEMS AND METHODS FOR USER-SPECIFICATION AND SHARING OF BACKGROUND SOUND FOR DIGITAL TEXT READING AND FOR BACKGROUND PLAYING OF USER-SPECIFIED BACKGROUND SOUND DURING DIGITAL TEXT READING

CROSS REFERENCE TO RELATED APPLICATIONS

This application is a continuation-in-part of, and claims priority to, U.S. patent application Ser. No. 12/927,145 titled "System and Method for Providing Music Based on a Mood," filed on Nov. 8, 2010 which claims priority U.S. Provisional Patent Application Ser. No. 61/280,736, filed on Nov. 9, 2009 titled "Atmosphere Software Application", the entire contents and disclosures of all of which are incorporated herein in full by reference as if stated in full herein.

FIELD OF THE INVENTION

The field of the present invention is background music and/or sound for digital reading of digital text files.

BACKGROUND OF THE INVENTION

An exemplary embodiment of an exemplary text mood analyzer was disclosed in U.S. patent application Ser. No. 12/927,145 titled "System and Method for Providing Music Based on a Mood," filed on Nov. 8, 2010 (the "Mood Music Application"), the entire contents and disclosures of which have previously been incorporated by reference for all purposes hereinabove. As disclosed in the Mood Music Application, an exemplary embodiment of a Mood Analyzer would analyze a text file for moods. For example, an exemplary embodiment of a Mood Analyzer would analyze a book text, identifying a first text mood segment from, for example, page one through page "n" of the text; followed by a second text mood segment from page "n+1" through page "x." The exemplary Mood Analyzer would identify each text mood segment in a text file. The Mood Music Application discloses automatically selecting music with a corresponding mood and pairing the music selections for synchronized playback with a user's reading of the corresponding text mood segments. The Mood Music Application further discloses facilitating a reading user's later synchronized playback with the reading user's reading of the corresponding text mood segments.

Some readers might prefer to specify their own music picks or favorites for playback during a reading of a digital text file. Some way is needed to facilitate user specification of a user's music picks for background playback during a reading of a digital text file.

Some readers might want to participate in a reading community that would facilitate some reading users specifying their own music picks or favorites for playback during a reading of a digital text file, and that would facilitate community sharing of such reading user picks with other reading users. For example, one reading user might want to specify their own music picks or favorites for playback during a later reading of a particular digital text file; that reading user might want to share their picks with other reading users; other reading users might want to read the particular digital text file in conjunction with the aforementioned playback picks by the aforementioned reading user. A way is needed to facilitate such a reading community.

SUMMARY OF THE INVENTION

Exemplary embodiments of the present invention would provide an exemplary coordinated music identification playlist editor with which a user (sometimes referred to herein as a playlist programmer, or a playlist creator, or a playlist-creator-user) would identify music selections (in the form of a customized playlist, or simply, a playlist) for coordinated playback that would be synchronized with a later reading by a reading user of a particular digital text file. Exemplary embodiments would further facilitate a reading user's selection of a particular playlist for coordinated playback that would be synchronized with the reading user's reading of the particular digital text file.

Exemplary embodiments of the present invention would provide exemplary computer systems and methods that would facilitate a sharing across a reading community of charted playbacks of music selections for later readings of digital works. In particular, exemplary embodiments of the present invention would provide exemplary computer systems and methods that would: facilitate a first reading user specifying a first set of music selections for a charted playback during a reading of a particular digital text file; facilitate said first reading user making available for sharing with other reading users, said first set of music selections for a charted playback during a later reading of said particular digital text file; and facilitate at least a second reading user reading the particular digital text file in conjunction with said charted playback of said first set of music selections.

BRIEF DESCRIPTION OF THE DRAWINGS

These and other features of the present invention are more fully set forth in the following description of exemplary embodiments of the invention. The description is presented with reference to the accompanying drawings in which.

DETAILED DESCRIPTION OF THE INVENTION

Figure 1:
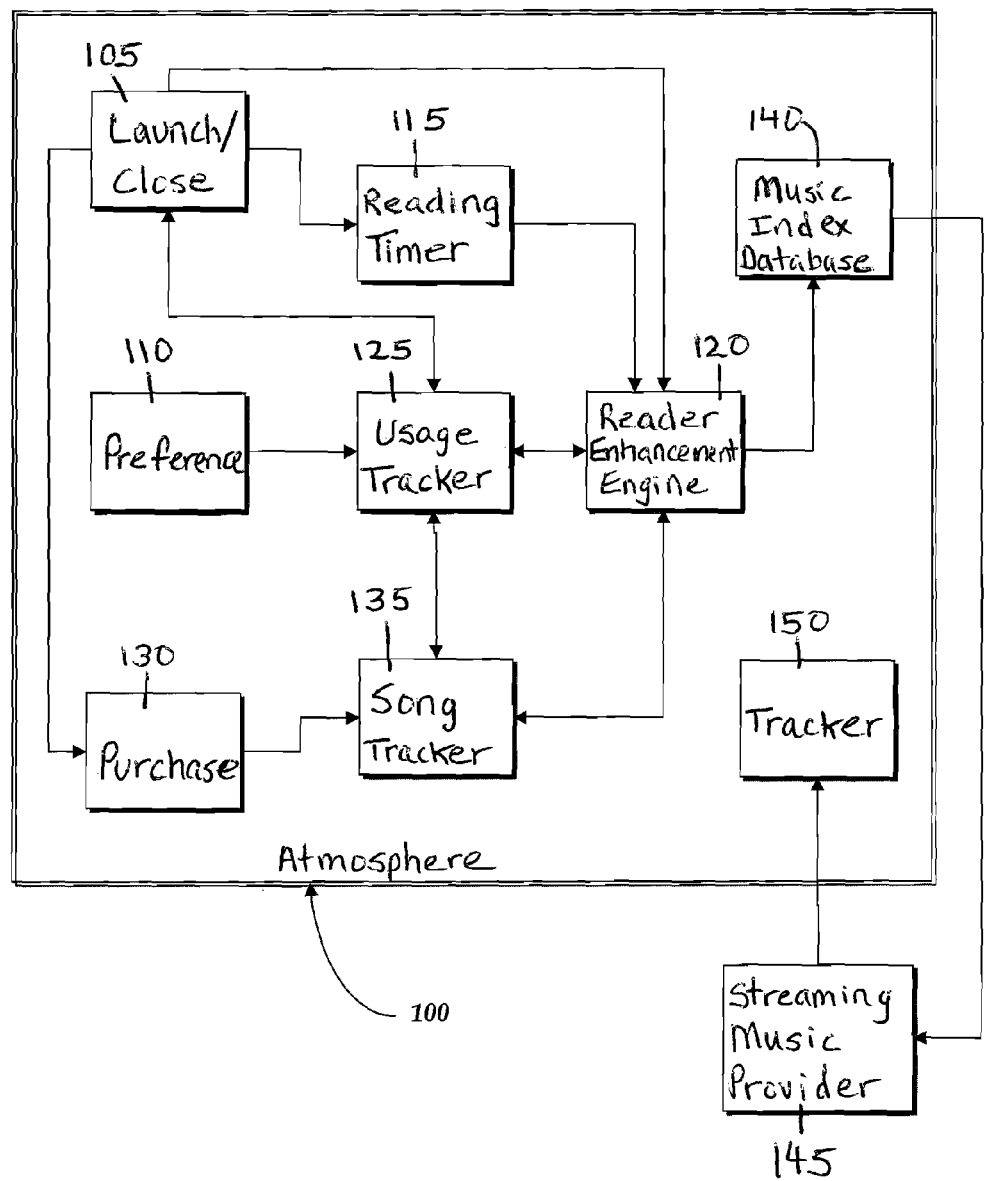
FIG. 1 is a high-level schematic diagram depicting exemplary high-level logic components of an exemplary embodiment of a system for analyzing moods associated with a digital text file and for automatically synchronizing a playing of an at least one work of music with an automatically determined reading speed by a reader of the digital text file in an exemplary embodiment of the present invention.
Figure 2:
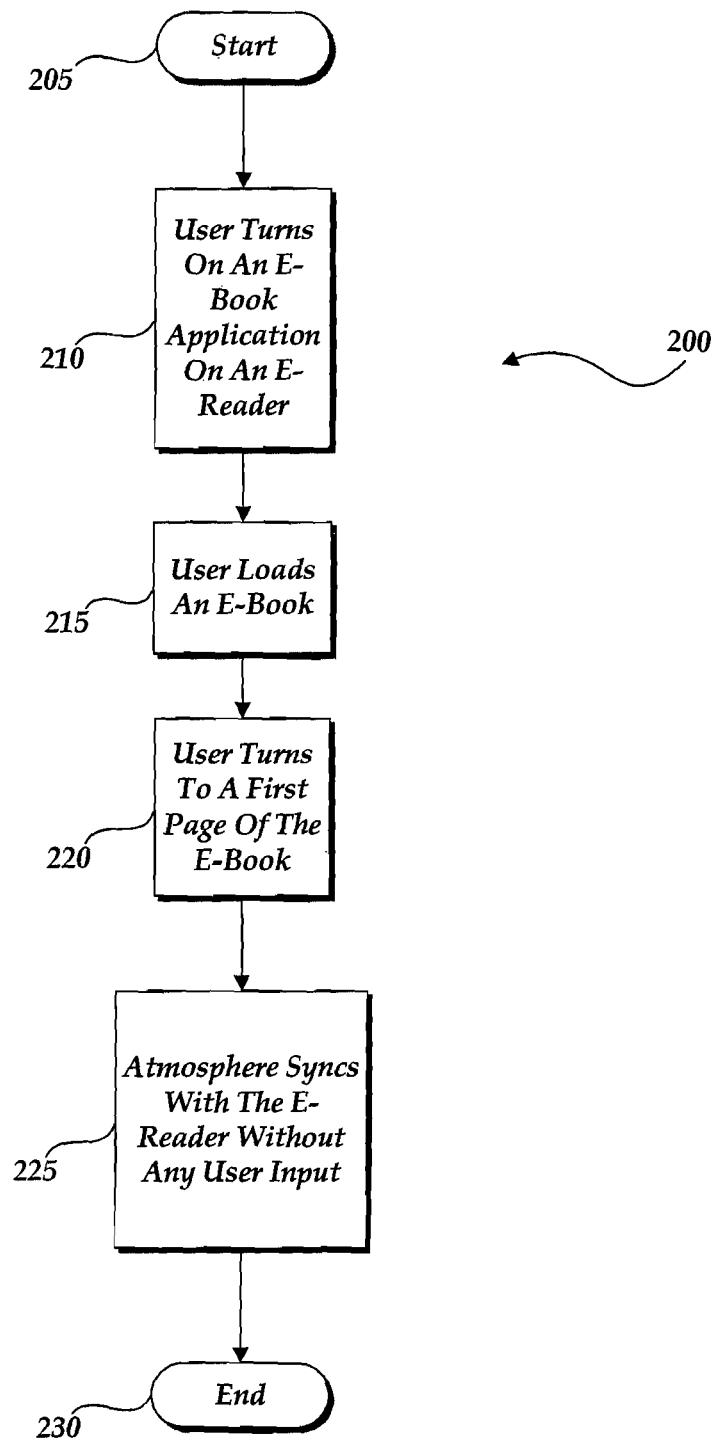
FIG. 2 is a high-level flow diagram depicting exemplary high-level logic functions for synchronizing a playing of background music with a reading of a digital book in an exemplary embodiment of the present invention.
Figure 3:
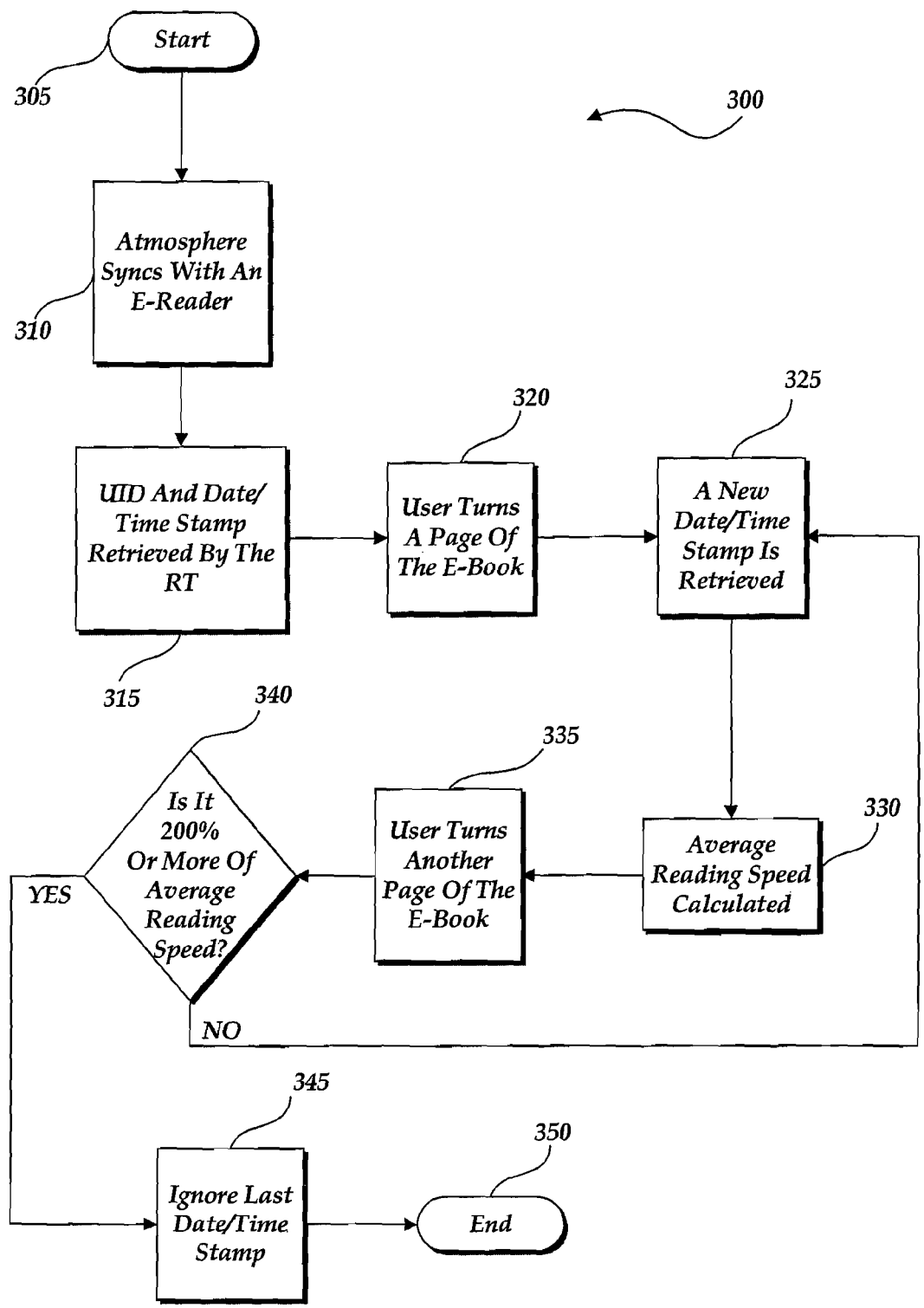
FIG. 3 is a high-level flow diagram depicting exemplary high-level logic functions for timing a user's average reading speed in an exemplary embodiment of the present invention.
Figures 1, 4:
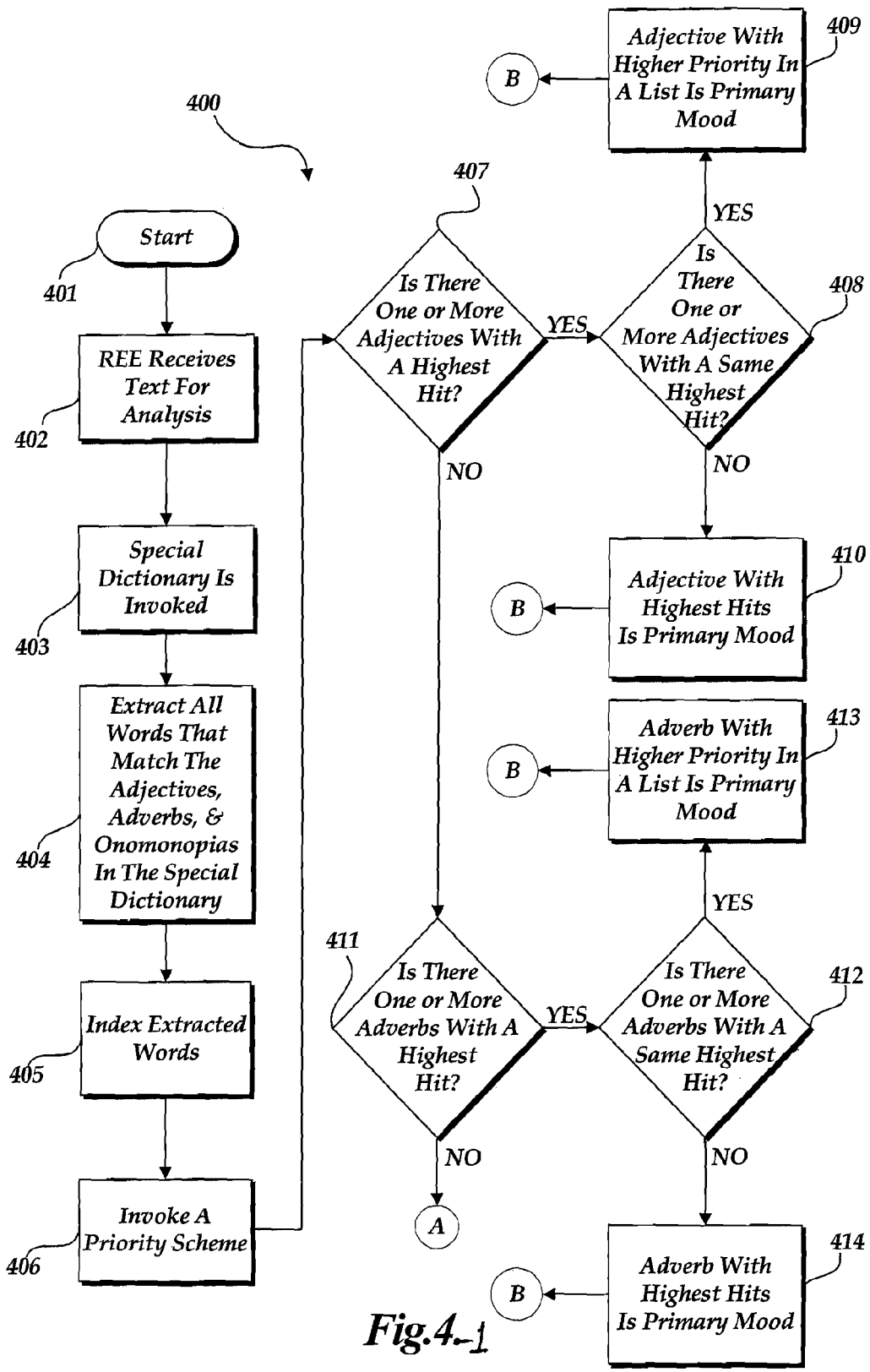
FIG. 4 (4-1 through 4-3 is a high-level flow diagram depicting exemplary high-level logic functions for analyzing the text of an digital text file for moods in an exemplary embodiment of the present invention.
Figures 2, 4:
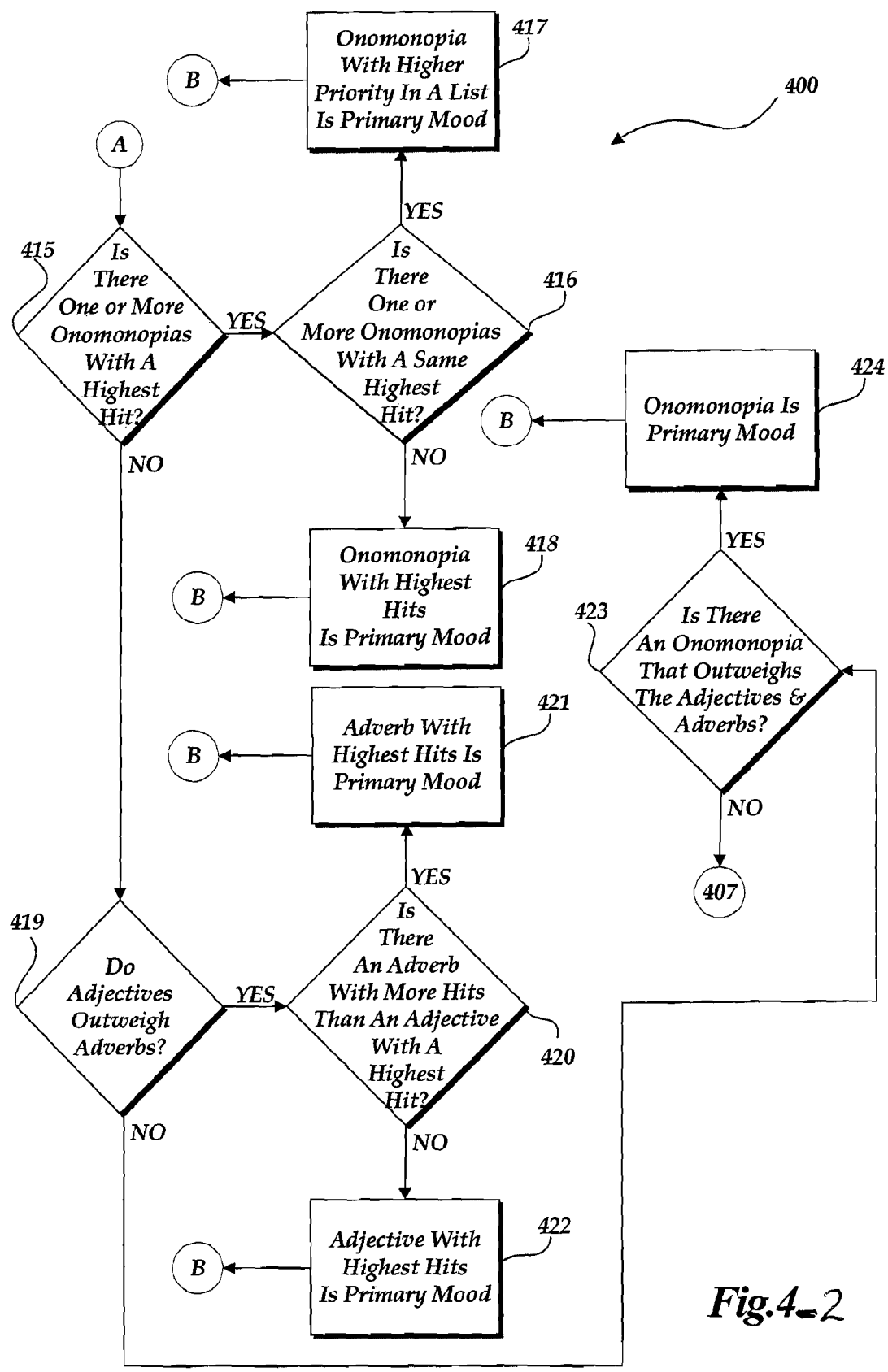
Figures 3, 4:
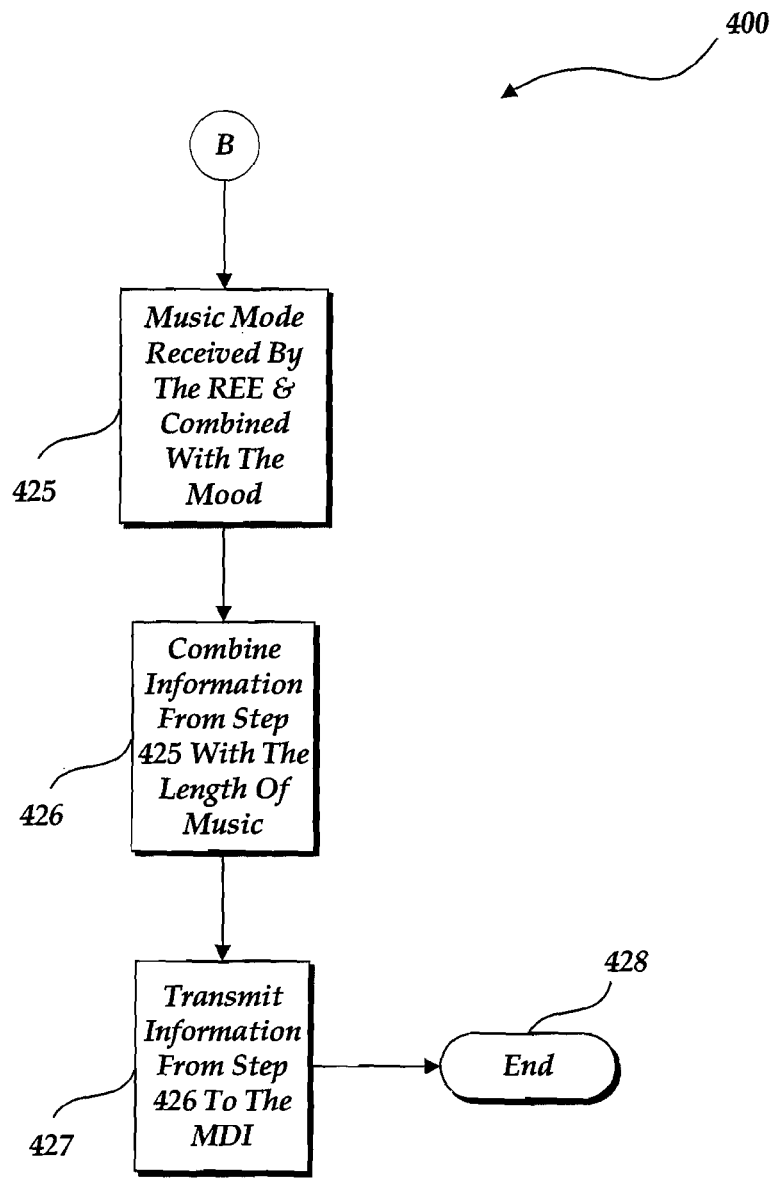
Figure 5:
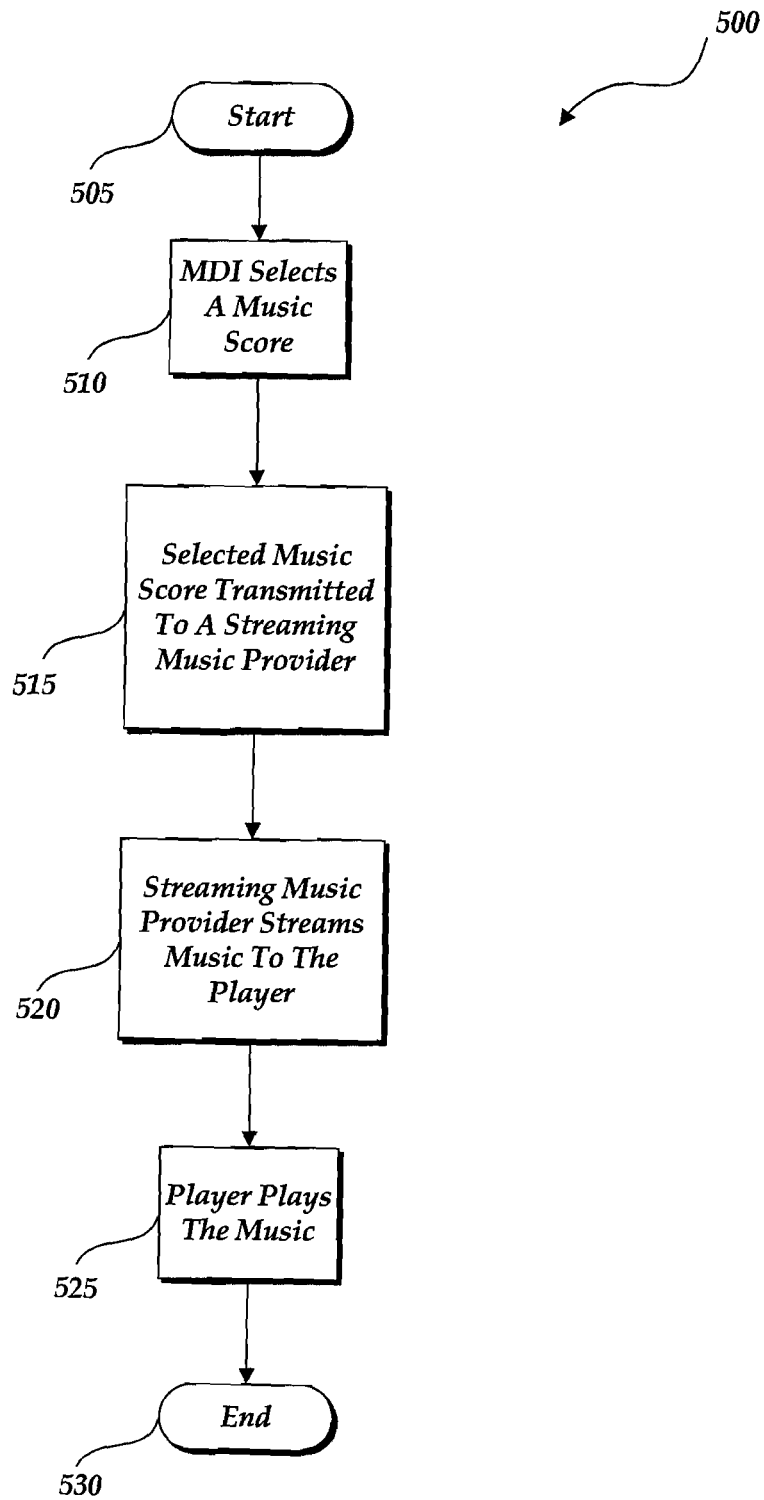
FIG. 5 is a high-level flow diagram depicting exemplary high-level logic functions for playing music that matches the primary mood and the user's music preference during the user's reading of a digital text file in an exemplary embodiment of the present invention.

As an alternative to automatic music selection, exemplary embodiments of the present invention would provide a specialized text file editor, sometimes referred to herein as an exemplary coordinated music identification playlist editor, that would graphically identify text mood segments within a digital text file (also sometimes referred to herein as a "digital literary work") as identified by an exemplary embodiment of the Mood Analyzer; using the graphic text mood segment identification, a user would personally identify music and/or sound (including, for example, segments of silence and/or sound effects) selections (a user's "playlist") to be played as background music in synchronization with a later reading (a "charted playback", sometimes referred to merely as a "playback"), such as by another user, of the corresponding text mood segments.

As will be understood by someone with ordinary skill in the art, reference herein to music selections for a playlist, or for a charted playlist, will include selections of sounds, such as, by way of non-limiting example, segments of silence and/or sound effects, and could include verbal background segments, including, for example, background talking of a crowd and the like. Reference to all of these types of sounds, and including other types of sounds, are included in references herein to music.

Users that create a charted playback of music selections for later synchronized playback for certain digital books or other digital literary works, may sometimes be referred to herein as a "playlist editor user" or alternatively, as a "charted-playlist-creator-user," a "charted playlist creator," or as "playlist programmers." A playlist editor user's sections of music and charting of those music selections for synchronized playback with a later reading of specific segments of text within the digital text file will sometimes be referred to herein as the user's "charted playlist."

As will be further described below, exemplary embodiments of the present invention would facilitate a particular user (a playlist editor user) picking a particular digital literary work, e.g., a book, and would further facilitate that particular user picking a selection of digital musical works and then charting a synchronized playback of that selection of digital musical works for a synchronized charted playback in conjunction with a later reading of particular digital literary work. That is, the playlist editor user would identify, for each segment of text in the particular digital literary work, a digital music work, or a portion of a digital music work (or alternatively, a digital sound work, including a segment of silence, and/or segments of sound effects), to be played during a later reading of the relevant segment of text.

Some exemplary embodiments would facilitate the charting of a playback of the selection of digital musical works according to a charted synchronization with segments of the digital literary work according to text mood segments as identified by an exemplary embodiment of the Mood Analyzer described further below. That is, an exemplary Mood Analyzer would analyze the moods presented by a digital literary work, and would identify a mood (or moods) associated with various segments of text within that digital literary work. Digital works of music would likewise be analyzed for moods.

However, charting digital music work playback according to text mood segments is not a limitation of the invention. Rather, exemplary embodiments would facilitate a playlist editor user overriding a Mood Analyzer mood, by charting for a particular text segment, a digital music work (or alternatively, a digital sound work, including a segment of silence, and/or segments of sound effects) that comprises a mood that does not match the mood that had been determined by the Mood Analyzer. Further, some exemplary embodiments would facilitate a playlist editor user identifying a user-customized text segment for a synchronized playback of a particular digital music work without regard to mood.

As will be understood by someone with ordinary skill in the art, reference herein to music selections, digital music works, and the like, are not limited to entire musical works. For example, a playlist editor user may want to include in a charted playlist an excerpt from a larger work of music, such as a small portion of an opera or symphony piece. Exemplary embodiments of the present invention would facilitate a playlist editor user identifying a portion of a particular work of music as a music selection for inclusion in the particular charted playlist to be played during a later reading of a particular portion of the relevant text file. For example, a symphony piece may comprise many movements, each of which may comprise a different mood. A playlist editor user may want to identify a particular movement of the larger symphony to be included in a particular playlist. Exemplary embodiments of the present invention would facilitate the playlist editor user identifying the particular movement from the particular symphony for inclusion in the relevant charted playlist.

As further described below, once a playlist editor user creates a charted playlist, the exemplary embodiment would: facilitate the playlist editor user making available for sharing with various reading users, the charted playlist for synchronized charted playback during a later reading of the particular digital text file; and facilitate reading users reading the particular digital text file in conjunction with a synchronized charted playback of the charted playlist.

Exemplary Website

Figure 6:
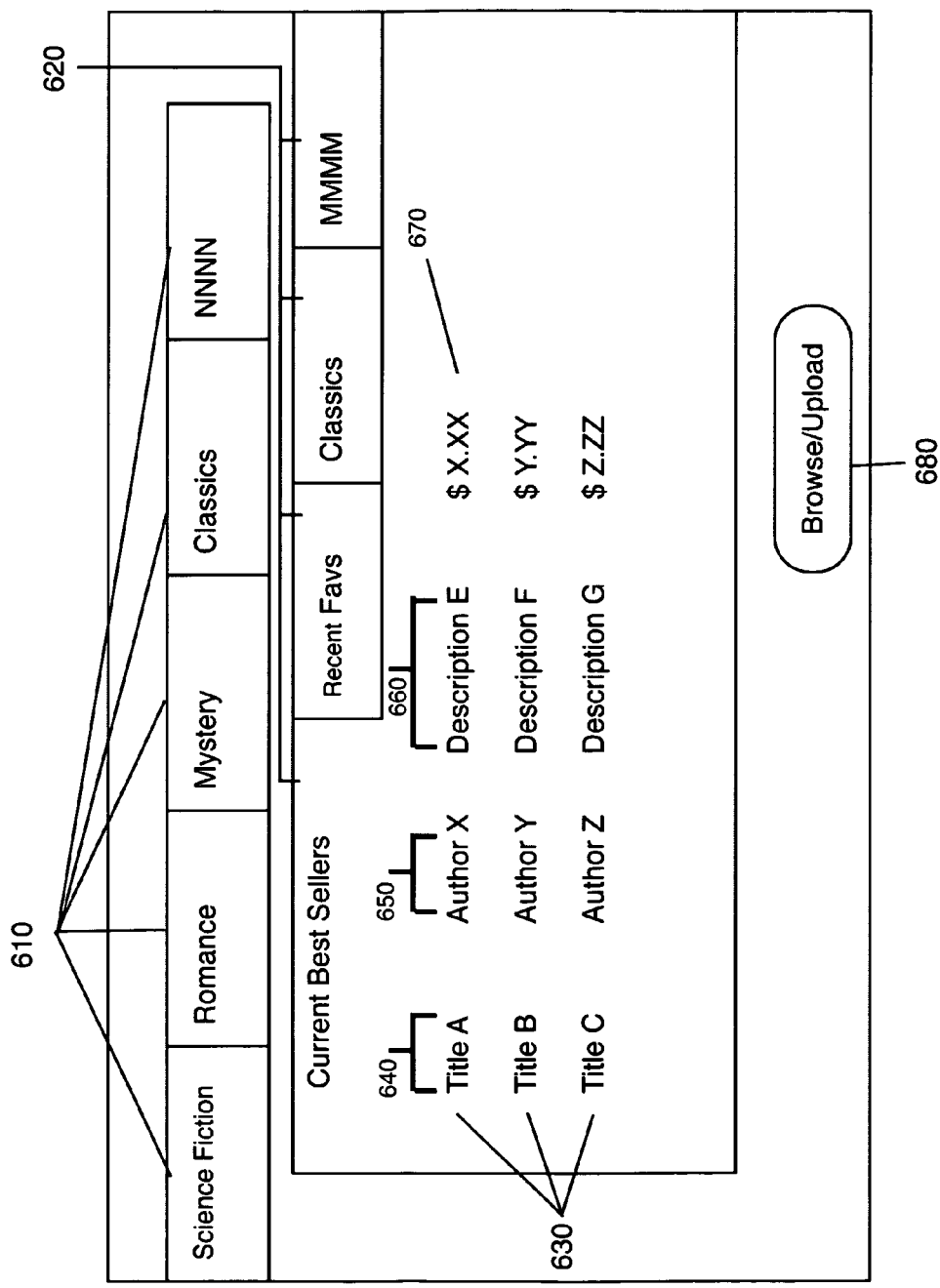
FIG. 6 depicts an exemplary bookstore webpage in an exemplary embodiment of the present invention.

In an exemplary embodiment of the present invention, an exemplary website would be provided. FIG. 6 depicts an exemplary website webpage in an exemplary embodiment of the present invention. In particular, FIG. 6 depicts an exemplary website bookstore or storefront webpage in an exemplary embodiment of the present invention. One or more server computers would be programmed, alone or in conjunction with each other, to provide functionality as illustratively described below for the exemplary bookstore website.

As will be understood by someone with ordinary skill in the art, the exemplary description herein of an exemplary bookstore embodiment is illustrative and non-limiting. Rather, alternative exemplary embodiments would make digital text files available, e.g., render them through an analysis by an exemplary Mood Analyzer, for exemplary playlist editor users to create charted playlists for the relevant digital text files. After a playlist editor user creates a charted playlist for a particular digital text file, exemplary embodiments would facilitate the playlist editor user making that charted playlist available to a reading community. Some exemplary embodiments websites would then facilitate a reading user purchasing the digital text file and the charted playlist together, or alternatively, would facilitate the reading user merely purchasing the text file, or (such as if the reading user already has a copy of the particular text file) would facilitate the reading user merely selecting (and/or purchasing) the charted playlist. So, once a charted playlist is made available to the reading community, reading users that buy or otherwise already have a copy of the particular text file with which the charted playlist is associated, could buy/select one or more charted playlists for that text file.

As will be understood by someone with ordinary skill in the art, the illustrative description herein of an exemplary bookstore website for selecting and/or uploading text and launching an exemplary coordinated music identification playlist editor is non-limiting. One alternative exemplary embodiment would provide software, such as could be purchased on a memory storage device, such as a CD or flashdrive or like memory storage device, or as could be downloaded from the Internet, for installation and execution on an individual computer; execution of such software would provide functionality of the exemplary coordinated music identification playlist editor described herein on the individual computer; a user of such software could purchase and/or download a text file from any source, process the text file using the exemplary coordinated music identification playlist editor and then make the edited version of the text file available for others, such as by uploading the edited version of the text file to a site, such as a web page, accessible by user's that want to use the user-specified mood music playlist.

As will also be understood by someone with ordinary skill in the art, reference herein to a server computer being programmed to perform the functions described herein is not a limitation of the present invention; a single server computer, or a plurality of server computers in conjunction with each other, could be programmed to perform the described functions without departing from the spirit of the present invention. As will be understood, description herein of computer-accessible memory is not limited to memory directly accessible by a particular server computer, but may include memory that is accessible, such as with cloud computing, by a remotely located server computer that provides information through a communications network, such as the Internet, to a particular server computer.

One or more server computers would be programmed, alone or in conjunction with each other, to provide an exemplary webpage, such as is depicted in FIG. 6, in the exemplary bookstore website for facilitating access by a user to exemplary lists of book titles for purchase selection by the user or, in the case of publicly available ("public domain") works of text, for free selection by the user. In alternative exemplary embodiments, as previously mentioned above, a user would not necessarily purchase a text file, such as a book, but could choose to merely select the text file for rendering using the exemplary Mood Analyzer editor, or as also previously mentioned above, for customized text segment editing, to create a charted playlist.

As illustratively depicted in FIG. 6, an exemplary bookstore website would provide, for example, various exemplary book type tabs 610, and within each book type, various exemplary book category tabs 620; on a page, or pages, for a particular book category tab, a plurality of books 630 would be listed, for example, identifying each book's title 640, author 650, short description 660 and a download/selection price 670. To select a book, a user would click a particular book listing 630.

As an alternative to selecting a book from the book listings provided by the exemplary bookstore website, the exemplary bookstore website would also provide an option for a user to browse and upload 680 a text file for processing using the exemplary coordinated music identification playlist editor as described further below.

Launching Book in an Exemplary Editor

Figure 7:
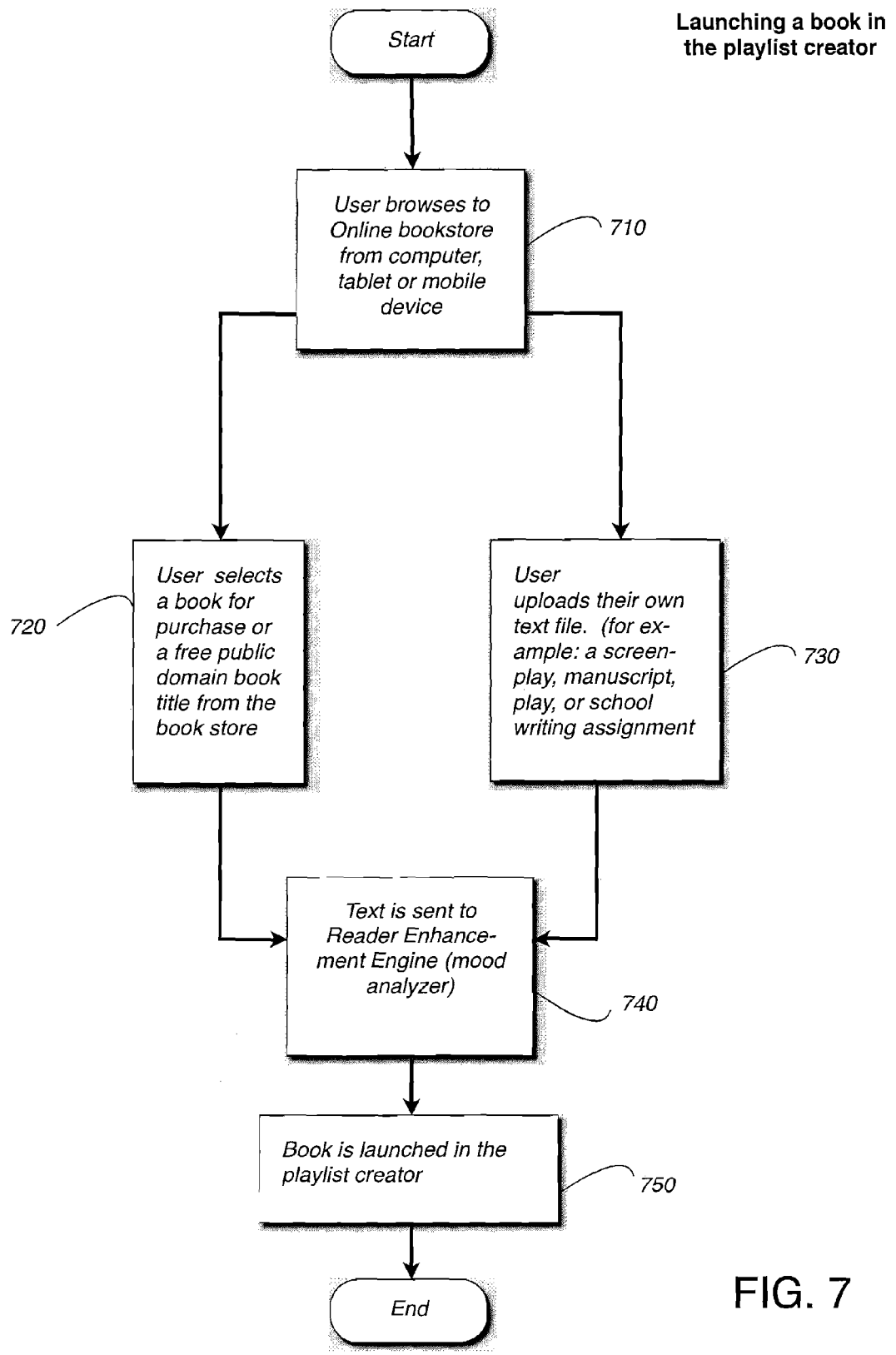
FIG. 7 is a high-level flow diagram depicting exemplary high-level logic functions for launching a digital book in an exemplary coordinated music identification playlist editor in an exemplary embodiment of the present invention.

FIG. 7 is a high-level flow diagram depicting exemplary high-level logic functions for launching a digital book in an exemplary coordinated music identification playlist editor (sometimes referred to herein as a text file editor, or a text editor) in an exemplary embodiment of the present invention. As will be understood by someone with ordinary skill in the art, a user could use any one of a number of types of computer devices, such as a wireless computer device, a tablet computer device, a specialized digital book reading device, or an intelligent phone, to access and browse 710 an exemplary bookstore website at which an exemplary coordinated music identification playlist editor in an exemplary embodiment of the present invention would be provided.

As will be understood by someone with ordinary skill in the art, the present invention is not limited to the types of devices illustratively discussed and/or mentioned herein but would include access by any type of computer device whether know known or in the future discovered.

Exemplary browser software could comprise, for example, SAFARI®, GOOGLE®, CHROME®, INTERNET EXPLORER®, MOZILLA®, or any of various types of browser software currently available. However, as will be understood by someone with ordinary skill in the art, the present invention is not limited to existing web browser software. Rather, exemplary embodiments could use any type of software, whether now known or in the future discovered, capable of rendering to a user's client computer device, hyper-media content from a computer device, such as a server computer device, that is accessed from the user's client computer device over a communications network, such as the Internet.

As illustratively depicted in FIG. 7, a user would access and browse 710 an exemplary bookstore website and, depending on the user's circumstances and/or preference, would either select 720 a book for purchase or a free publicly accessible (public domain) book, or would upload 730 a text file using the exemplary website, for processing using the exemplary coordinated music identification playlist editor. For example, a user could upload 730 a text file comprising, by way of non-limiting example, an original work, a screen-play, a manuscript, a play, a school writing assignment, or other text file.

In alternative exemplary embodiments, as previously mentioned above, a user would not necessarily purchase a text file, such as a book, but could choose to merely select the text file for rendering using the exemplary Mood Analyzer editor, or as also previously mentioned above, for customized text segment editing, to create a charted playlist.

Continuing with reference to FIG. 7, selecting 720 a book title from the exemplary bookstore/website, or uploading 730 a text file would cause one or more exemplary server computers to provide 740 the user-selected, or user-uploaded, text, as the case may be, to a text mood analyzer, an illustrative embodiment of which was disclosed in U.S. patent application Ser. No. 12/927,145 titled "System and Method for Providing Music Based on a Mood," filed on Nov. 8, 2010, previously incorporated by reference for all purposes hereinabove and high-level functions of which are summarized above. In the exemplary embodiment, the user-selected, or user-uploaded, text, as the case may be, would be launched 750 in the exemplary coordinated music identification playlist editor.

Creating Mood Segments in a Text File

Figure 8:
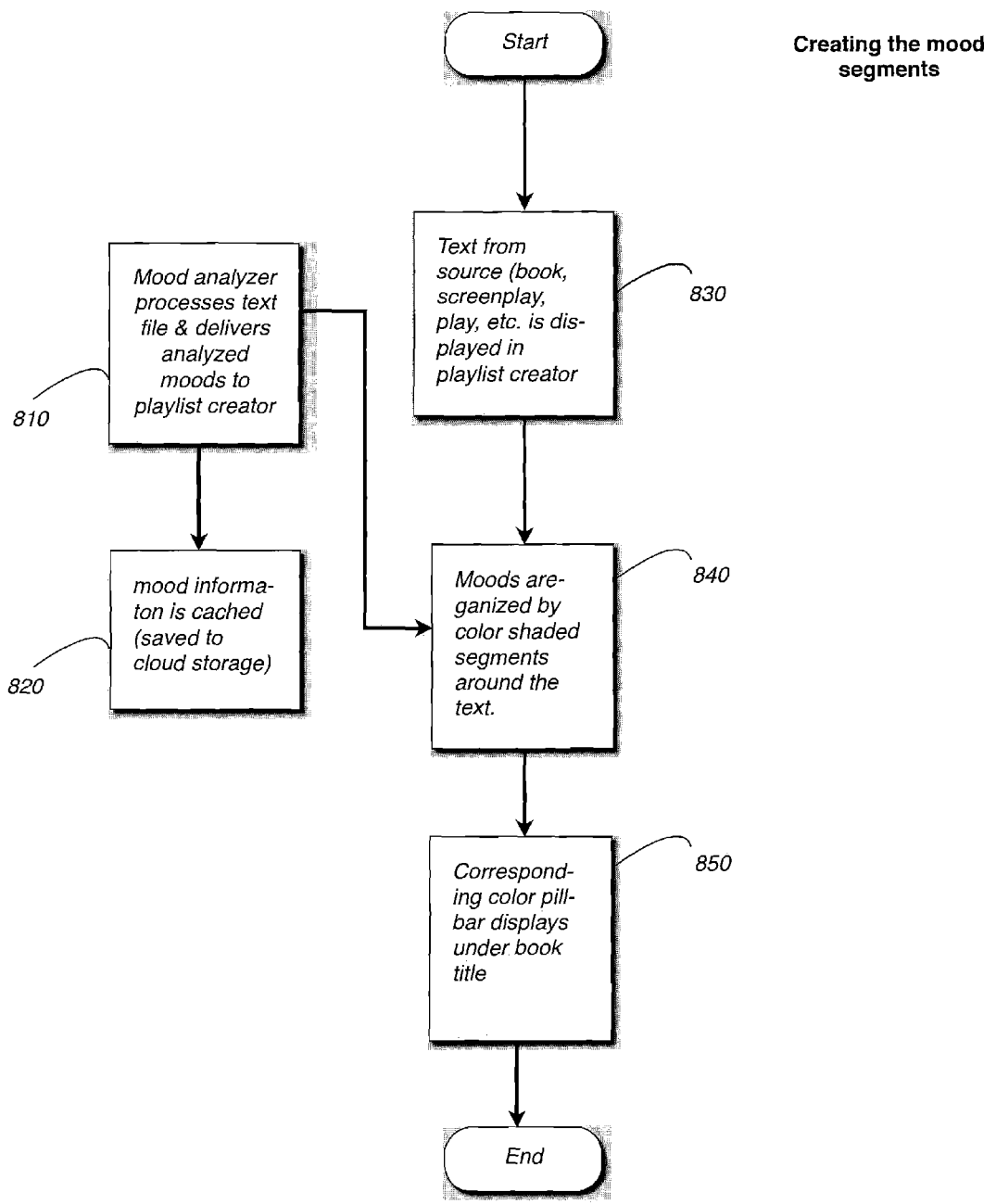
FIG. 8 depicts exemplary high level logic functions for launching an exemplary text file in an exemplary coordinated music identification playlist editor embodiment of the present invention.

FIG. 8 depicts exemplary high level logic functions for launching (see element 750 depicted in FIG. 7) an exemplary text file in an exemplary coordinated music identification playlist editor embodiment of the present invention. As depicted in FIG. 8, an exemplary text file would be displayed 830 in the exemplary coordinated music identification playlist editor. The exemplary text file would be processed 810 by the exemplary Mood Analyzer.

The exemplary Mood Analyzer would optionally store (cache) 820 mood analysis results, for example, in a memory storage device, such as in cloud storage. In one embodiment, the exemplary Mood Analyzer would store (cache) 820 mood analysis results only the first time a particular text file is analyzed through the exemplary website. In such an embodiment, when another user later wants to create a personalized charted playlist for the same particular text file, the mood analysis for that particular text file could be retrieved from storage rather than the text file being resubmitted to the exemplary Mood Analyzer for re-analysis. As will be understood by someone with ordinary skill in the art, storing mood analysis results for a particular text file the first time that the particular text file is analyzed for moods would enhance processing efficiency of the same text file for subsequent users wanting to use the exemplary coordinated music identification playlist editor for the same text file.

As will be understood by someone with ordinary skill in the art, in some exemplary embodiments, the Mood Analyzer, as compared to being enabled on a website, would be enabled on a digital reading device. In such an exemplary digital reading device embodiment, the Mood Analyzer operating on the digital reading device would store (cache) 820 mood analysis results only the first time a particular text file is analyzed on that particular digital reader.

As depicted in FIG. 8, text mood segments would be graphically depicted 840 in the text displayed in the exemplary coordinated music identification playlist editor. In one exemplary embodiment, each text mood segment would be shaded with a particular color highlighting the relevant segment of text. An exemplary color-coordinated "pill-bar" would be generated 850 for display below the text.

Figure 9A:
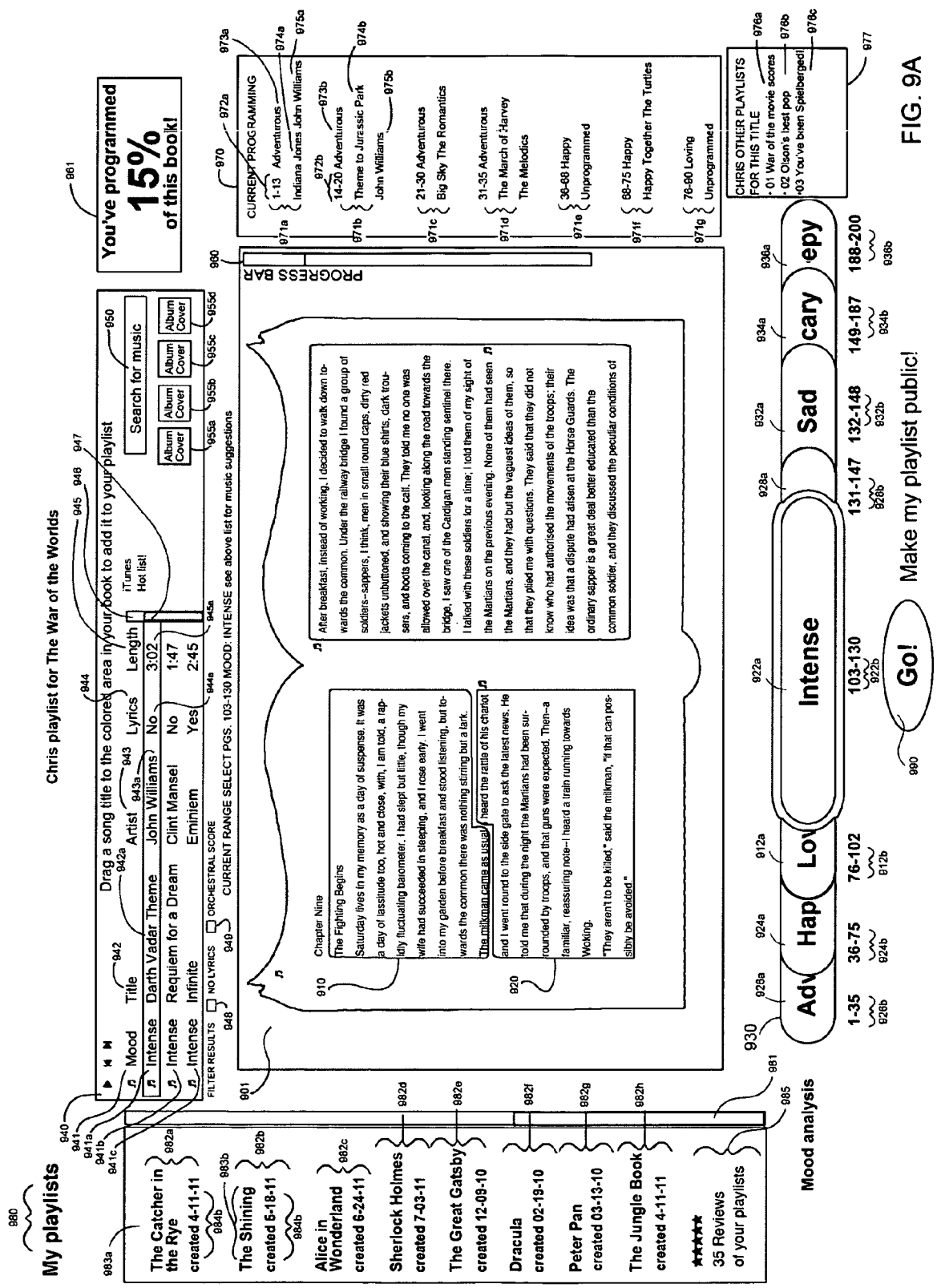
FIGS. 9A-9F depict an exemplary web page display, including magnified views, of illustrative text that has been launched in an exemplary coordinated music identification playlist editor embodiment of the present invention.
Figure 9B:
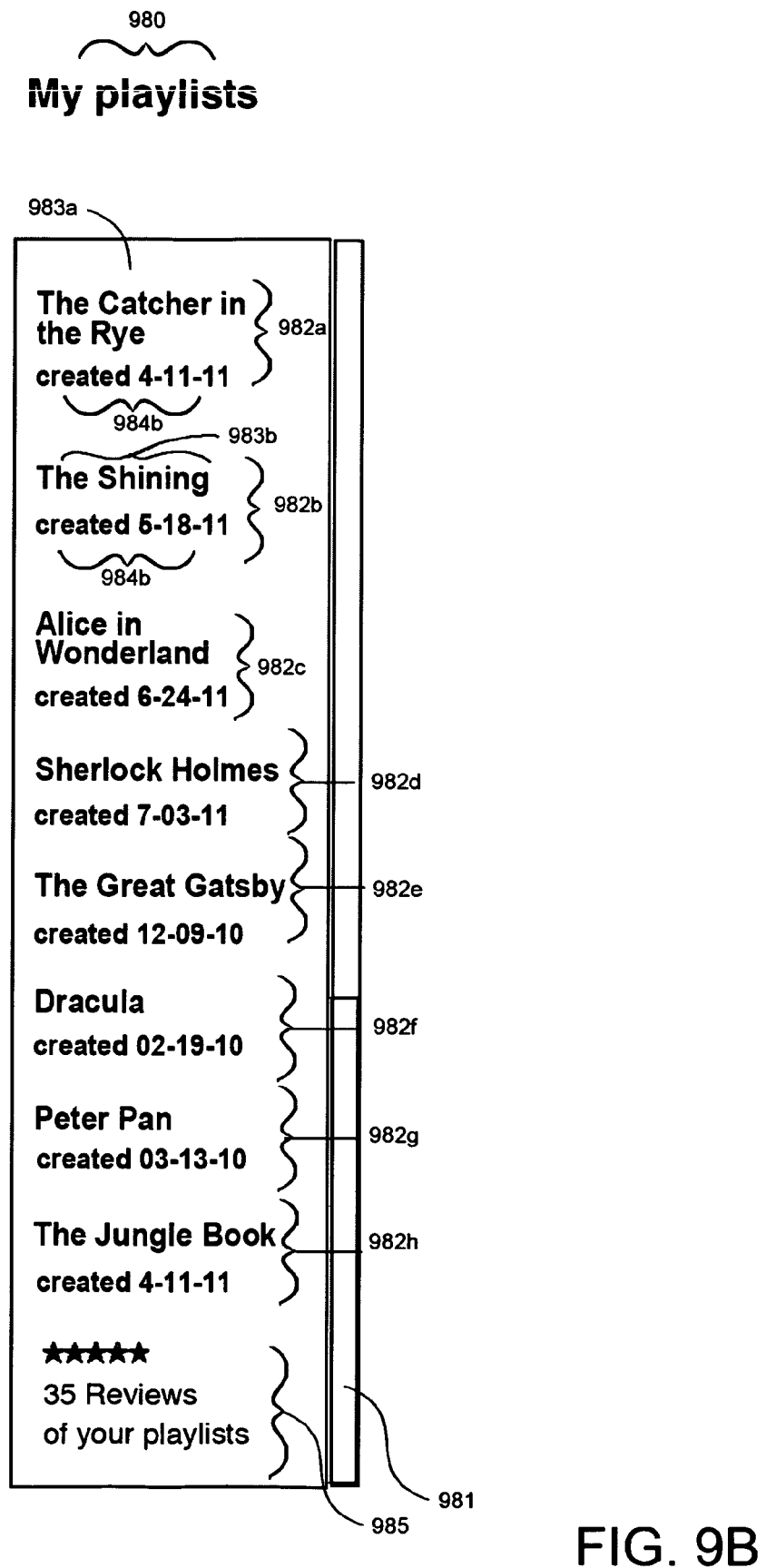
Figure 9C:
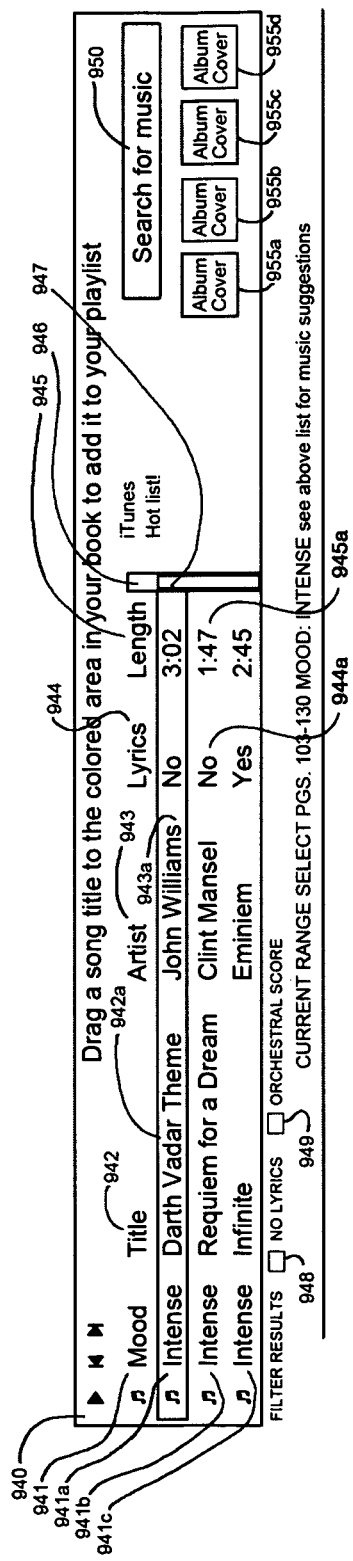
Figure 9D:
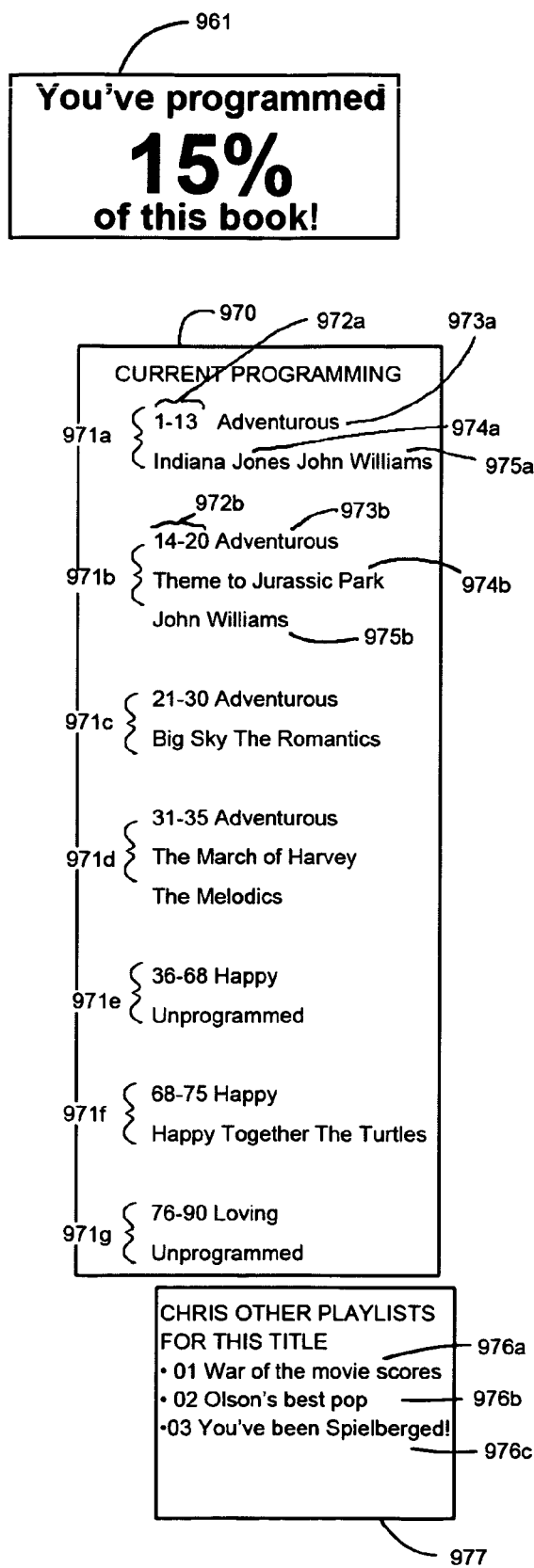
Figure 9E:
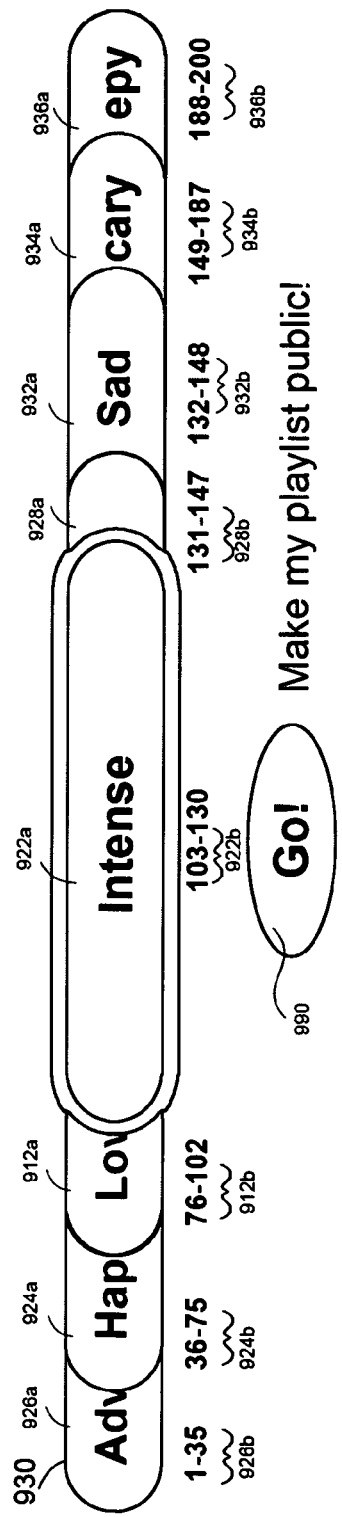
Figure 9F:
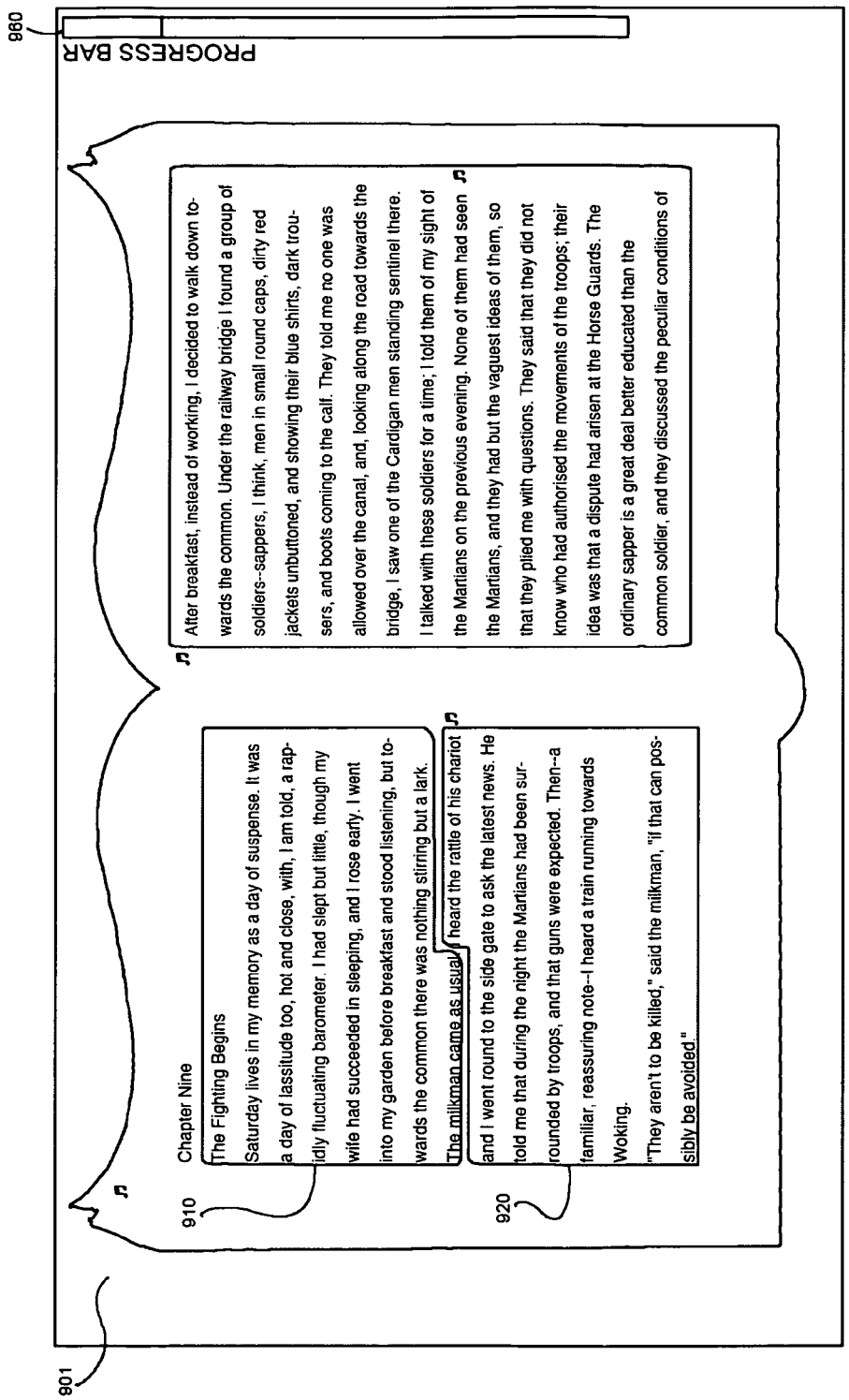

FIG. 9A, AND FIGS. 9B-9F depict an exemplary web page display of illustrative text that has been launched in an exemplary coordinated music identification playlist editor embodiment of the present invention. As depicted in FIG. 9A and FIG. 9F, an exemplary text file display window 901 would display color-shaded text mood segments, e.g., exemplary color-coded text mood segments 910 and 920. As further depicted in FIG. 9A and FIG. 9E, an exemplary color-coordinated "pill-bar" 930 would be generated and displayed comprising selectable color-coded mood sections, e.g., 912a, 922a, 924a, 926a, 928a, 932a, 934a, and 936a. Each selectable exemplary color-coded mood section, e.g., 912a, 922a, 924a, 926a, 928a, 932a, 934a, and 936a, would correspond in color and mood to a mood text segment in the text filed displayed in exemplary text file display window 901 (see FIG. 9A and FIG. 9F).

For example, exemplary mood text segment 910 is color-coded with a particular exemplary color (depicted with a first type of cross-hatching) and corresponds to an exemplary mood of "loving"; a corresponding selectable exemplary color-coded mood section, e.g., 912a, corresponds in color (depicted with the same first type of cross-hatching) and mood ("loving") with the particular exemplary color and mood characterizing exemplary mood text segment 910.

Similarly, exemplary mood text segment 920 is color-coded with another particular exemplary color (depicted with a second type of cross-hatching) and corresponds to another exemplary mood of "intense"; a corresponding selectable exemplary color-coded mood section, e.g., 922a, corresponds in color (depicted with the same second type of cross-hatching) and mood ("intense") with the particular exemplary color and mood characterizing exemplary mood text segment 920. Exemplary page range indicators, e.g., 912b, 922b, 924b, 926b, 928b, 932b, 934b, and 936b, identify the page numbers within the text file corresponding in mood to the relevant selectable exemplary color-coded mood sections, e.g., 912a, 922a, 924a, 926a, 928a, 932a, 934a, and 936a.

As further depicted in FIG. 9A and FIG. 9C, the exemplary embodiment would also display an exemplary music advertisement ("ad") window 940 of "ads" (advertisements or listings) for various selectable works of music, e.g., 941a-941c and 955a-955d. As depicted in FIG. 9A and FIG. 9C, exemplary music "ads", e.g., 941a-941c, would comprise an indication of a mood 941, a title 942, an artist 943, whether the music comprises lyrics 944, and the length of time that the work plays 945. As depicted in FIG. 9A and FIG. 9C, other exemplary music "ads", e.g., 955a-955d, would comprise a thumbnail portrait depicting the work, with an artist name and title, or other information. As depicted in FIG. 9A and FIG. 9C, an exemplary music search field 950 would be provided in an exemplary embodiment to facilitate a user searching for a particular piece of music. The exemplary embodiment would further facilitate a user searching for music according to mood and/or other criteria (such as would be associated with works of music according to "Meta data" that may be associated with a particular digital work of music).

As previously mentioned above, charting digital music work playback according to text mood segments is not a limitation of the invention. Rather, exemplary embodiments would facilitate a playlist editor user overriding a Mood Analyzer mood, by charting for a particular text segment, a digital music work (or alternatively, a digital sound work, including a segment of silence, and/or segments of sound effects) that comprises a mood that does not match the mood that had been determined by the Mood Analyzer. Further, some exemplary embodiments would facilitate a playlist editor user identifying a user-customized text segment for a synchronized playback of a particular digital music work without regard to mood.

Music "Ads"

Figure 10:
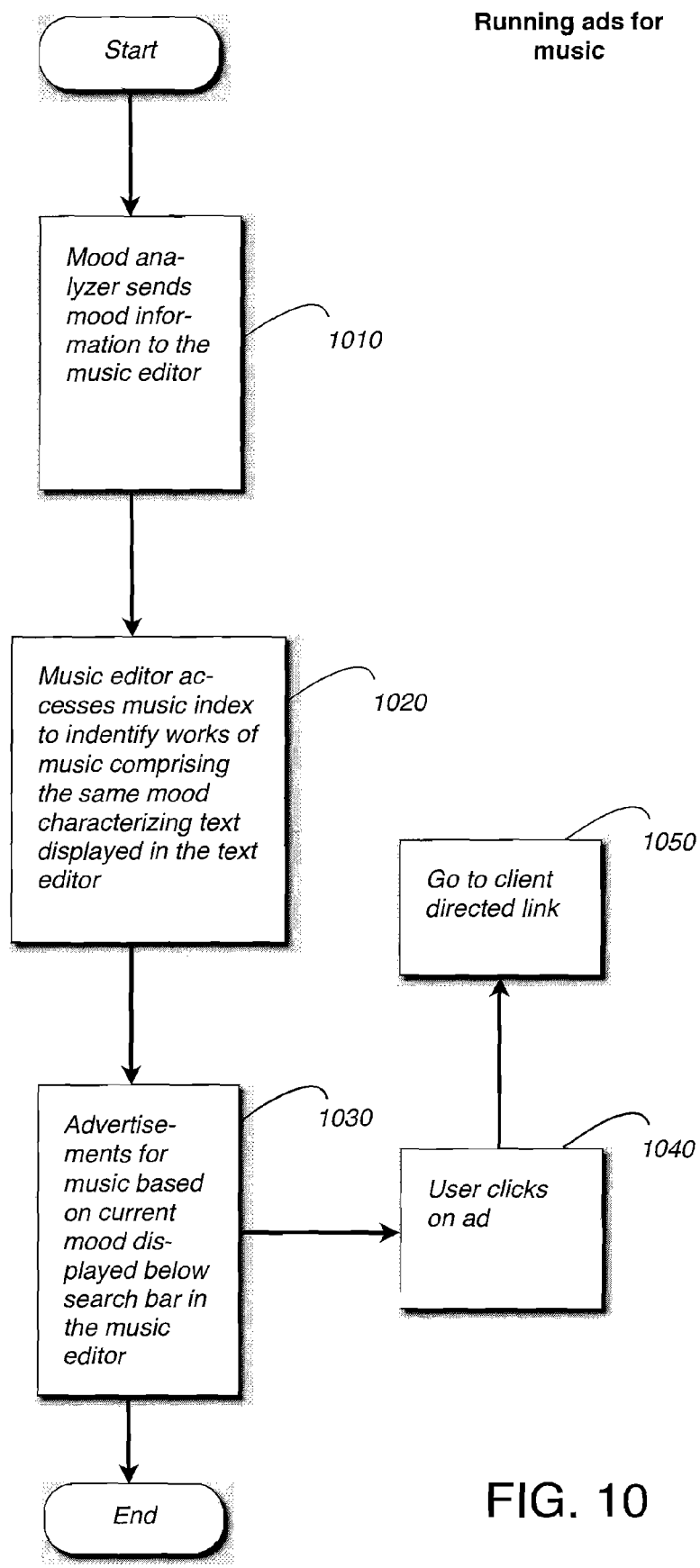
FIG. 10 depicts exemplary high-level logic functions for presenting music advertisements ("ads") in an exemplary music advertisement ("ad") window in an exemplary embodiment of the present invention.

FIG. 10 depicts exemplary high-level logic functions for presenting music "ads" in an exemplary music "ad" window in an exemplary embodiment of the present invention. As depicted in FIG. 10, an exemplary mood analyzer (see, e.g., 740, depicted in FIG. 7) would analyze an exemplary text file; as depicted in element 1010 of FIG. 10, the exemplary mood analyzer would send mood information about the exemplary text file to an exemplary music editor. The exemplary music editor would access 1020 music listings in an exemplary music index to identify works of music that comprise the same mood characterizing a section of text displayed in the exemplary coordinated music identification playlist editor. The exemplary music editor would then display 1030 (such as in the exemplary music advertisement ("ad") window 940 depicted in FIG. 9A and FIG. 9C) "ads" for works of music that comprise the same mood characterizing a section of text displayed in the exemplary coordinated music identification playlist editor. In order to select a particular work of music to be associated for later playback with a particular section of text in a displayed text file, a user would select 1040, such as by "clicking", a particular ad for a particular work of music. The exemplary embodiment would then obtain 1050 the selected work of music from a linked location, according to the user-indicated selection a particular work of music.

In one exemplary embodiment, songs would be organized in the exemplary music "ad" window 940 (depicted in FIG. 9A and FIG. 9C) in alphabetical order beginning with works of music that are characterized with a mood most represented on the book page that is currently open in the exemplary text file display window 901 (depicted in FIG. 9A and FIG. 9F). An exemplary sliding scroll bar 946 and a corresponding sliding scroll button 947 would be provided to facilitate a user being able to scroll through the listing of works of music displayed in the exemplary music "ad" window 940.

It will be understood by someone with ordinary skill in the art that the above-mentioned exemplary organization of works of music in an alphabetical order is illustrative and exemplary and is not a limitation of the present invention. Rather, in other embodiments, other methods of organizing a display of works of music could be used without departing from the spirit of the present invention.

For example, works of music could be organized according to rating statistics from a community of users.

As a user turns pages of the text file displayed in the exemplary text file display window 901 (depicted in FIG. 9A and FIG. 9F), if the mood changes from a previously-displayed page to a-newly-displayed page, then the exemplary embodiment would update the listing of works of music displayed in the displayed in the exemplary music "ad" window 940 (depicted in FIG. 9A and FIG. 9C) to display works of music that are characterized with a mood most represented on the newly-displayed book page(s) that is/are currently open in the exemplary text file display window 901 (depicted in FIG. 9A and FIG. 9F).

In the event that a user searches for a particular work of music and selects that work of music to be associated with a section of text that is characterized by a particular mood, the exemplary embodiment would store the mood identified by the user with the work of music. For example, if a user were to select a work of music that had not previously been indexed or characterized as being associated with the mood "Happy," and if the user were to associate that work of music with a section of a text file characterized by the mood "Happy," the exemplary embodiment would update the meta data for the work of music to include the "Happy" mood designation by the user.

Figure 11:
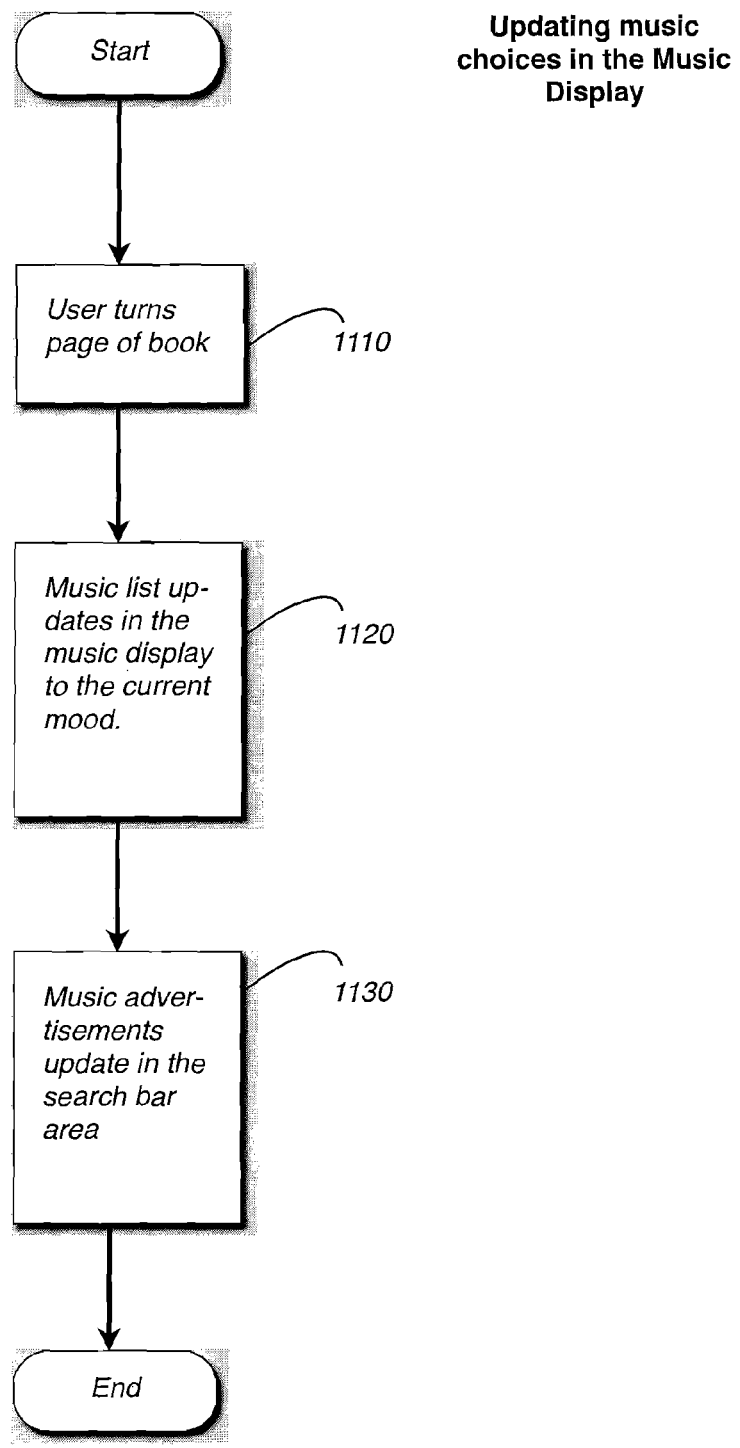
FIG. 11 depicts exemplary high-level logic functions for updating works of music listings displayed in an exemplary music "ad" window in an exemplary embodiment of the present invention.

As an alternative to the music "ads" or searching for works of music, the exemplary embodiment would facilitate a user uploading the user's own original work of music and identifying that work of music in the user's charted playlist. Updating Available Works of Music Icon Listings FIG. 11 depicts exemplary high-level logic functions for updating works of music listings displayed in an exemplary music "ad" window (e.g., element 940 depicted in FIG. 9A and FIG. 9C) in an exemplary embodiment of the present invention. As depicted in FIG. 11, as a user turns 1110 a page of a book (such as would be displayed in the exemplary text file display window 901 depicted in FIG. 9A and FIG. 9F), the exemplary embodiment would be programmed to update 1120 the listing of works of music (such as would be displayed in the exemplary music "ad" window 940 depicted in FIG. 9A and FIG. 9C). The exemplary embodiment would be further programmed to update 1130 other displayed music "ads", e.g., 955a-955d.

Exemplary filter criteria options would be provided as depicted, e.g., by exemplary filter criteria check boxes 948 ("No Lyrics") and 949 ("Orchestral Score"), to allow the user to filter works of music listed in the exemplary text file display window 901.

The exemplary embodiment would be programmed to respond to a double-click by a user of a particular ad for a particular work of music by playing an audio preview of the work of music.

Creating a Charted Playlist

Figure 12:
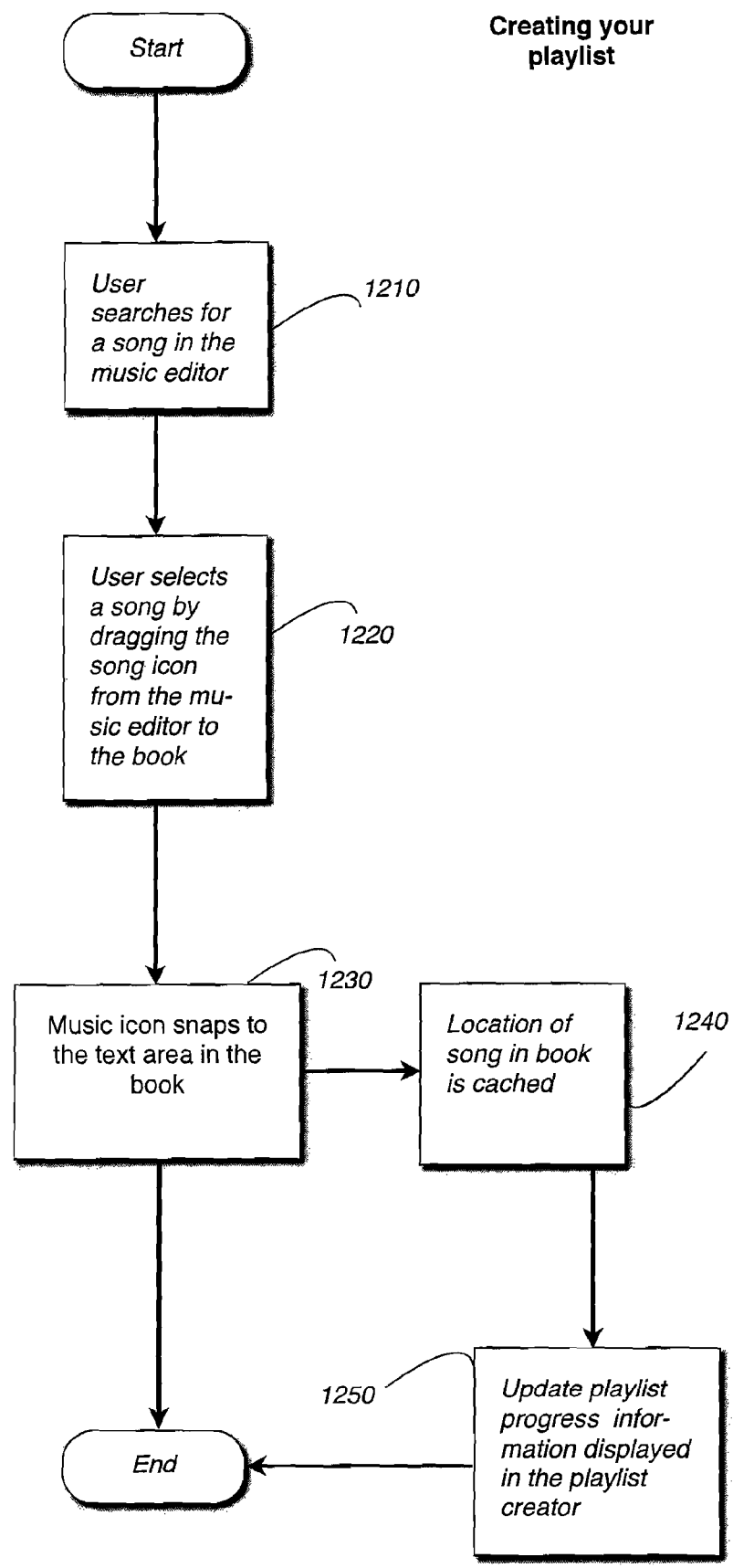
FIG. 12 depicts exemplary high-level logic functions for a user-creation of a playlist for a particular text file in an exemplary embodiment of the present invention.

FIG. 12 depicts exemplary high-level logic functions for creation of a user-specified charted playlist for a particular text file in an exemplary embodiment of the present invention. As depicted in FIG. 12, the exemplary embodiment would be programmed to facilitate a user searching 1210 for a work of music. To do that, the user could, for example, scroll through listings of works of music such as would be displayed in the exemplary music "ad" window 940 depicted in FIG. 9A and FIG. 9C. Alternatively, the user could enter search criteria in the exemplary music search field 950 as illustratively depicted in FIG. 9A and FIG. 9C. Or, the user could select from any of the other displayed music "ads", e.g., 955a-955d as illustratively depicted in FIG. 9A and FIG. 9C.

Returning with reference to FIG. 12, the exemplary embodiment would be programmed to facilitate the user selecting 1220 a particular work of music (such as by clicking a particular "ad") and dragging the icon associated with the work of music to a page in the text file such as would be displayed in the exemplary music "ad" window 940 depicted in FIG. 9A and FIG. 9C.

In response to the user dragging the icon associated with the work of music to a page in the text file, the exemplary embodiment would be programmed to "snap" 1230 the music icon into the text area of the text file, store (cache) 1240 the location at which the user has specified that the work of music should be associated with the text file, and update 1250 charted playlist progress information that would be displayed in an exemplary charted playlist progress activity monitor 970 as illustratively depicted in FIG. 9A and FIG. 9D. The exemplary embodiment would track charted playlist progress activity and would display, for example, an identification of an amount of the current text file 961 for which a charted playlist has been defined/specified. The exemplary charted playlist progress activity monitor 970 would comprise, for example, an identification of works of music, e.g., 971a-971g, that have been associated with the text file. An exemplary charted playlist progress activity monitor entry, e.g., 971a, would comprise, for example, an identification of a mood 973a associated with the work of music, an identification of pages within the text file 972a with which the work of music has been associated by the user, an identification (e.g., a title) of the work of music 974a, and an identification of a composer 975a, (or recording artist, performer, or other relevant information) as the case may be.

As depicted in FIG. 9A and FIG. 9B, as a user creates charted playlists for various text files, an exemplary charted playlist listing 980 for the particular user would be displayed. An exemplary charted playlist listing 980 would comprise, for example, a listing, e.g., 982a-982h, for each charted playlist that the particular user had created. Each charted playlist listing, e.g., 982a, would comprise, for example, a title 983a of the text file for which the particular user had created a charted playlist, and a date, e.g., 984b, that the user had created the charted playlist. An indication of a number of other-user reviews 985 would be provided, that would comprise a hypertext link to reviews by others of the charted playlists listed in the exemplary charted playlist listing 980.

The exemplary embodiment would facilitate a particular user creating more than one charted playlists for a single text file. FIG. 9A and FIG. 9D depicts an exemplary multiple charted playlist display 977 depicting illustrative charted playlists, e.g., 976a, 976b and 976c, that a particular user (i.e., the particular user viewing the exemplary webpage illustratively depicted in FIG. 9A and FIG. 9D).

Advanced Music Editing

Figure 13:
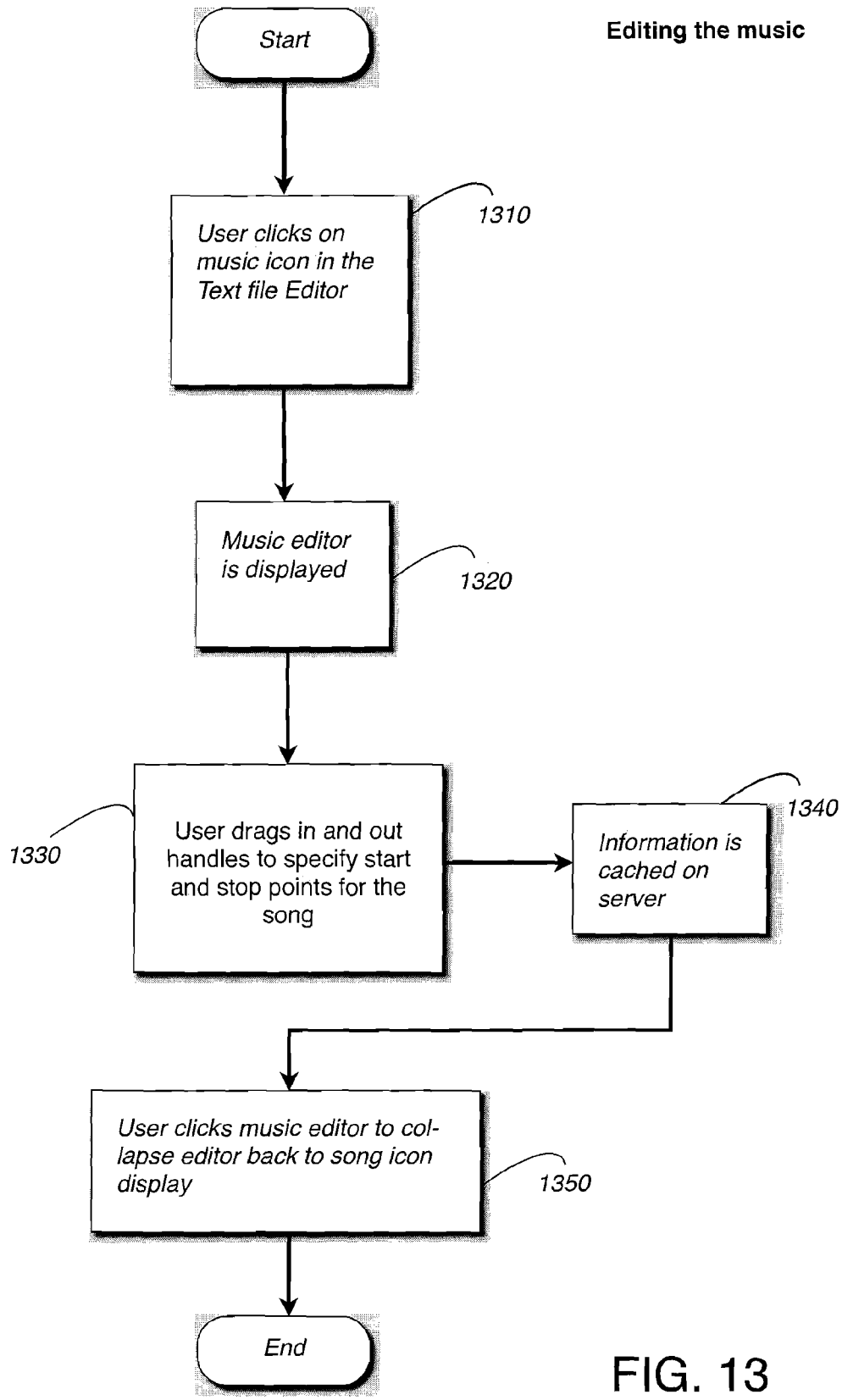
FIG. 13 depicts exemplary high-level logic functions of an exemplary use of an exemplary music editor in an exemplary embodiment of the present invention.

As a user creates a charted playlist for a particular text file, the exemplary embodiment would provide a music editor that would facilitate a user identifying either an entire work of music (as depicted for example, in FIG. 12), or a particular portion of a work of music as depicted in FIG. 13, to be associated with a particular section of the subject text file. FIG. 13 depicts exemplary high-level logic functions of an exemplary use of an exemplary music editor in an exemplary embodiment of the present invention. After a user has selected a particular work of music to be associated with a particular section of text in the subject text file (as depicted for example, in FIG. 12 and previously described above), a music editor would be provided that would facilitate a user clicking/selecting 1310 on the music icon for the relevant work of music that would be displayed in the section of the text to which the music icon had been dragged.

Figure 14:
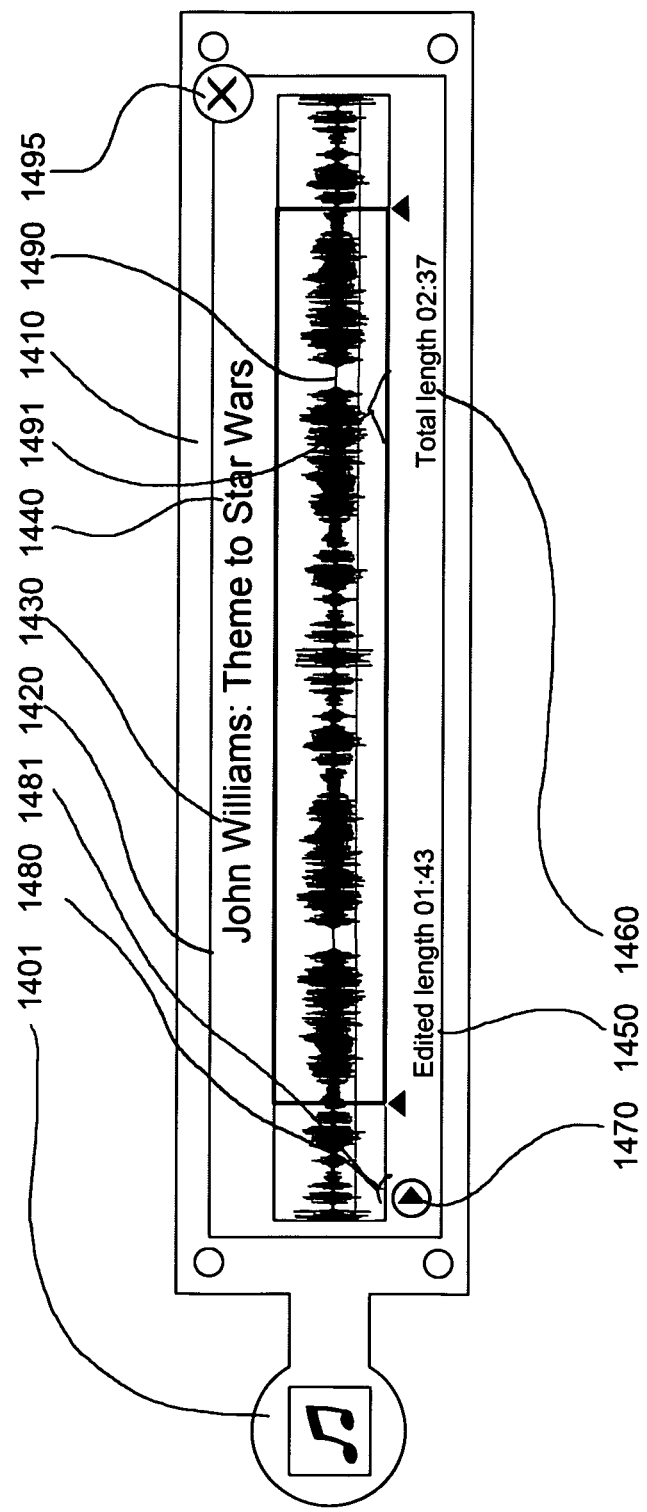
FIG. 14 depicts an exemplary enhanced, or "exploded," view of a music icon in an exemplary embodiment of the present invention.

Clicking on the music icon (e.g., element 1401 illustratively depicted in FIG. 14), or in the exemplary embodiment, "hovering" with the curser over the music editor icon (e.g., element 1401 illustrative depicted in FIG. 14), for the relevant work of music would result in a display 1320 in an exemplary music editor of an enhanced, or "exploded," view (e.g., element 1410 illustratively depicted in FIG. 14) of the relevant music editor icon (e.g., element 1401 illustratively depicted in FIG. 14).

As depicted in FIG. 14, an exemplary enhanced, or "exploded," view 1410 of a relevant music icon 1401 would comprise, for example, an enlarged view 1420 of the relevant music icon. The exemplary enlarged view 1420 would comprise, for example, an identification of various meta data that is associated with the work of music, such as, for example, an identification of the work of music 1440 that is associated with the relevant music icon 1401, an identification of a composer (or performer, or other identifying information) 1430 for the work of music.

The exemplary enlarged view 1420 would further comprise, for example, an identification of a total length in time 1460 for the work of music, a forward control 1470 for listening to the work of music, and exemplary, slidable, dragable, pointers 1480 and 1490, sometimes referred to herein as "handles", that the user may move to identify specific start (1481) and stop (1491) points for the particular work of music.

Returning with reference to FIG. 13, the exemplary embodiment would facilitate a user dragging 1330, or sliding, the exemplary, slidable, dragable pointers (e.g., element numbers 1480 and 1490 illustratively depicted in FIG. 14) to identify a particular starting point (e.g., element 1481 illustratively depicted in FIG. 14) within the work of music and a particular stopping point (e.g., element 1491 illustratively depicted in FIG. 14) within the work of music for play in association with the relevant section of text with which the relevant music icon (e.g., element 1401 illustrative depicted in FIG. 14) has been associated. After a user has identified and is satisfied with a particular starting point (e.g., element 1481 illustratively depicted in FIG. 14) within the work of music and a particular stopping point (e.g., element 1491 illustratively depicted in FIG. 14), the exemplary embodiment would store (cache) 1340 the start and stop points within the work of music to be associated with the relevant section of the text file. The user would then instruct the exemplary embodiment, and the exemplary embodiment would, collapse/close 1350 the exploded/enhanced view (e.g., element 1410 illustratively depicted in FIG. 14) by clicking on an exemplary close indicator (e.g., element 1495 illustratively depicted in FIG. 14).

Sharing a Charted Playlist; Rating Charted Playlists

Figure 16:
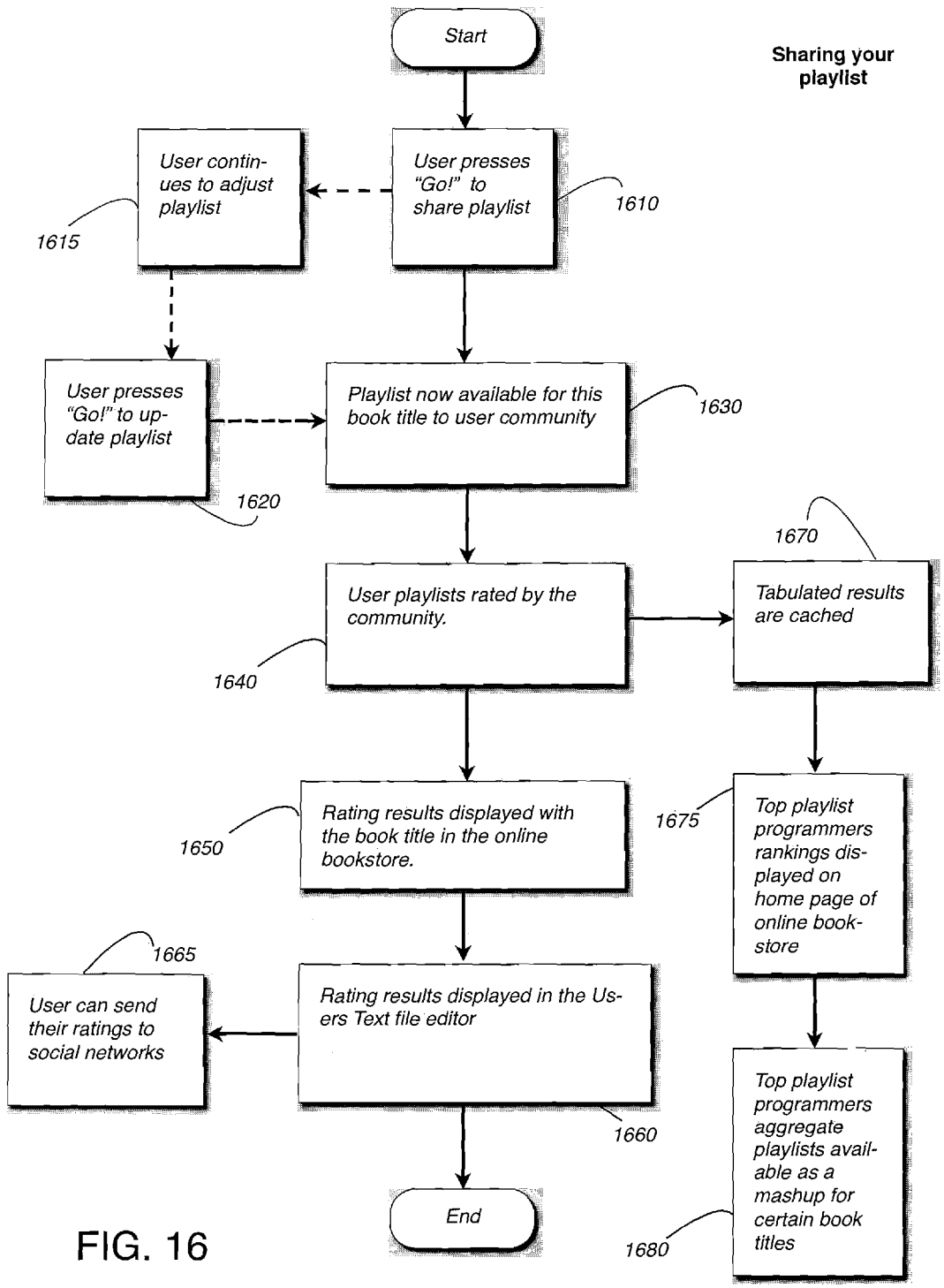
FIG. 16 depicts exemplary high-level functions for a user sharing a playlist for a particular text file in an exemplary embodiment of the present invention.

FIG. 16 depicts exemplary high-level functions for a user sharing a charted playlist for a particular text file in an exemplary embodiment of the present invention. As depicted in FIG. 16, once a user has completed identifying works of music to be associated with various mood-characterized sections of a text file, the exemplary embodiment would facilitate a user pressing 1610 an exemplary "GO" button (as illustratively depicted in FIG. 9A and FIG. 9E as element 990). As depicted in FIG. 16, if after having pressed the "GO" button, the user optionally continues to adjust the user's charted playlist 1615, the user may then again press the "GO" button, which would reflect the user's most recent updates to the charted playlist when the charted playlist is made available 1630 to a user community for the particular title associated with the text file.

As further depicted in FIG. 16, the exemplary embodiment would facilitate users in the user community rating 1640 the charted-playlist-creator-user's charted playlist(s). The exemplary embodiment would facilitate users rating particular segments of a charted playlist as well, as compared to rating an entire charted playlist. Tabulated results of the ratings would be stored (cached) 1670. Top rankings of charted-playlist-creator-users and/or of particular charted playlists would be displayed 1675, such as, for example, on a webpage of the exemplary online bookstore (as was previously described above with respect to FIG. 6). When a reading user selects a particular title for purchase, top playlist programmer charted playlists would be displayed 1680.

The exemplary embodiment would also facilitate user ratings of a particular selection of a particular work of music for a particular section of a particular text file. The exemplary embodiment would compile statistics on such text-file-section-specific ratings as well as the user preferences for the rating users, and would use the ratings and the user preference information associated with the rating users to automatically generate charted playlists for the same text file.

As further depicted in FIG. 16, rating results for each charted playlist would be displayed 1650 for the relevant book title in the online bookstore. Further, rating results would be displayed in the playlist programmer's text file editor 1660. The exemplary embodiment would facilitate the playlist programmer sending or otherwise posting their ratings and/or a ratings page to social networks, such as, but not limited to, FACEBOOK®.

Choosing a Charted Playlist in a Digital Reader

Figure 17A:
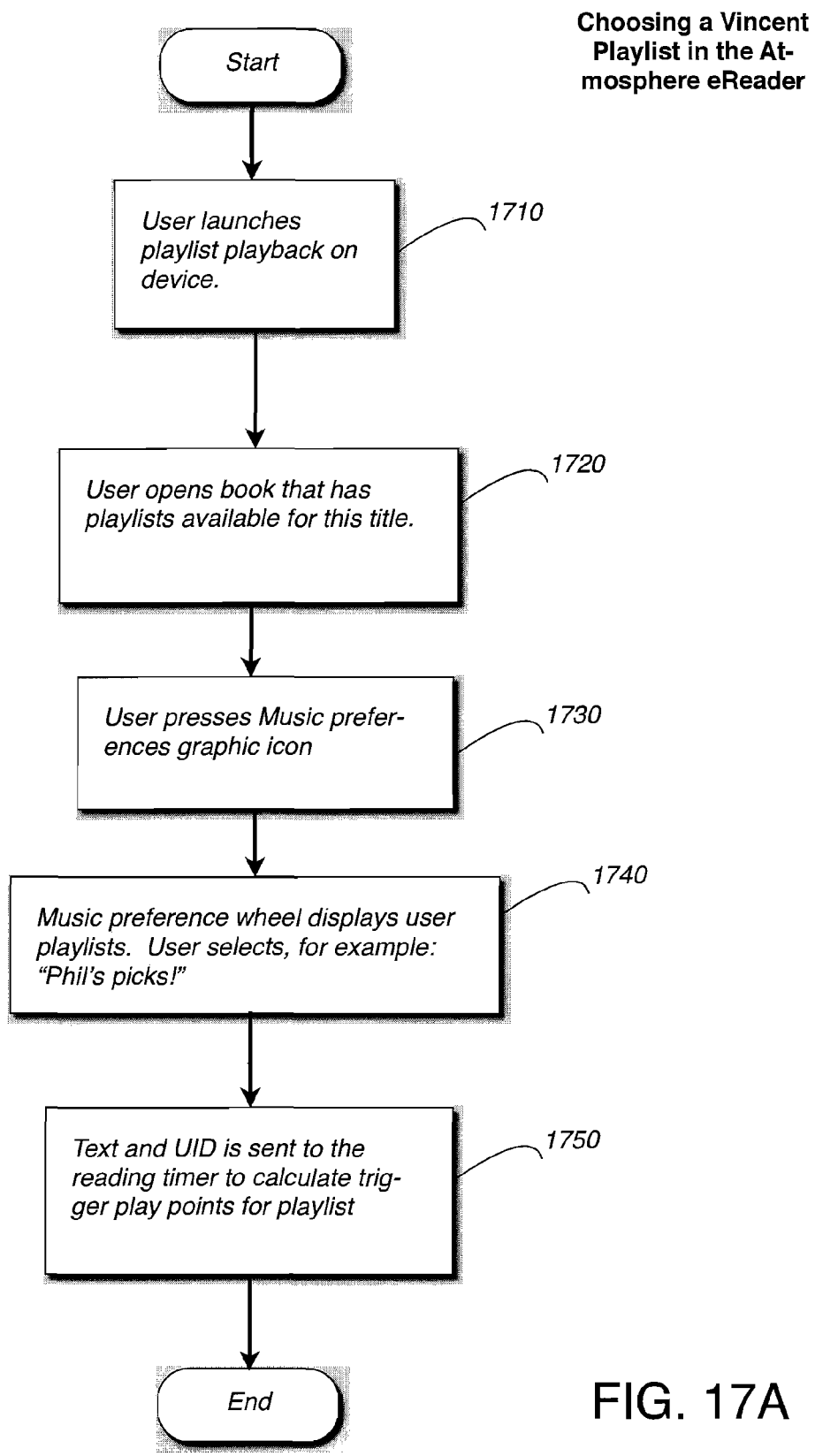
FIG. 17A depicts exemplary high-level logic functions for a reading user choosing a playlist for playback as the reading user reads a digital text file in an exemplary embodiment of the present invention.
Figure 17B:
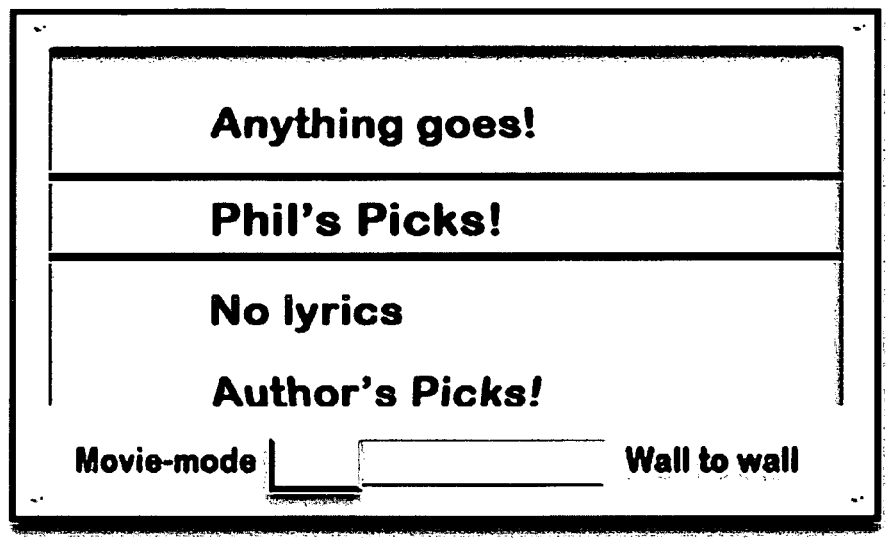
FIG. 17B depicts an exemplary view of an exemplary online selection screen for choosing a playlist.

FIG. 17A depicts exemplary high-level logic functions for a reading user choosing a charted playlist for playback as the reading user reads a digital text file in an exemplary embodiment of the present invention. As depicted in FIG. 17A, the exemplary embodiment would facilitate a reading user launching 1710 a playback of a particular charted playlist on the reading user's particular device (such as, by way of non-limiting example, any one of a number of types of computer devices, whether now known or in the future discovered, such as a wireless computer device, a tablet computer device, a specialized digital book reading device, or an intelligent phone). The reading user's particular device, on which an exemplary user-client embodiment of the present invention is installed and enabled, would facilitate the user opening 1720 a digital text file, such as a digital book, that has charted playlists available. The exemplary embodiment would facilitate the reading user identifying the reading user's music preferences 1730, such as by selecting a particular music preferences graphic icon. An exemplary music preference wheel would display 1740 an exemplary set of charted playlists for user selection. Once the reading user has selected a particular charted playlist, the exemplary embodiment would send text and a user identifier (UID) from the reading user's device to the Internet-enabled embodiment for calculation 1750 of trigger play points for the various works of music identified and associated with sections of the digital text file that the reading user is reading. FIG. 17B depicts an exemplary view of an exemplary online selection screen for choosing a playlist.

The exemplary embodiment would facilitate reading user followings of charted playlist creators. That is, if some reading users indicated a preference for charted playlists by a particular charted playlist creator, the exemplary embodiment would facilitate a reading user accessing charted playlists by that particular charted playlist user when the reading user downloads text files, such as books, for which a charted playlist has been created by the preferred charted playlist user. One exemplary erribodiment would provide a charted playlist user subscription for reading users.

Author's Picks

Figure 18A:
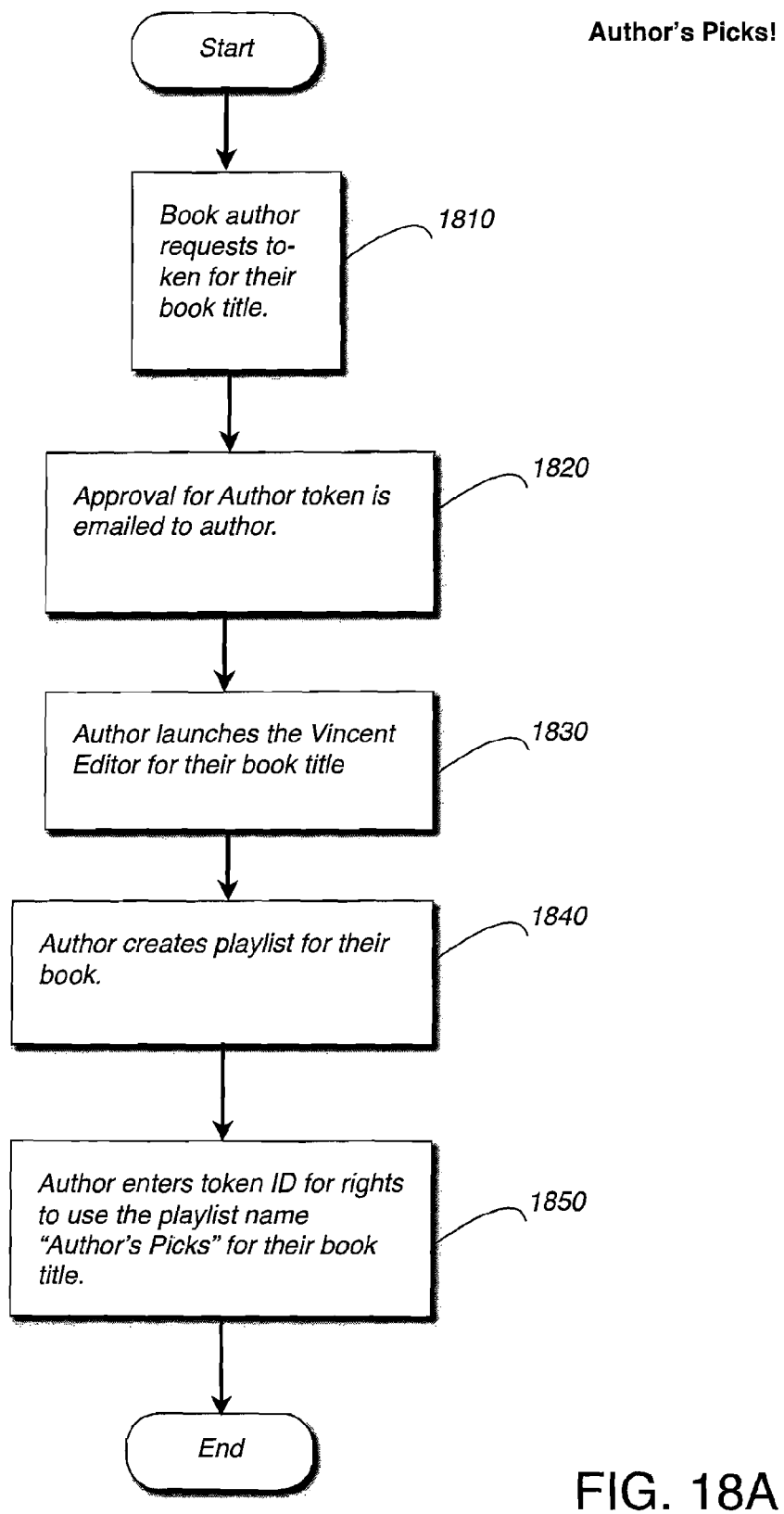
FIG. 18A depicts exemplary high-level logic functions for facilitating a special category of playlist, referred to as an "Author's Picks," in an exemplary embodiment of the present invention.

FIG. 18A depicts exemplary high-level logic functions for facilitating a special category of charted playlist, referred to as an "Author's Picks," in an exemplary embodiment of the present invention. As depicted in FIG. 18A, when an author writes a book, or other text work, the exemplary embodiment would facilitate the book author requesting 1810 a token for creating a charted playlist for their text work. Approval, such as from an administrative team of people for the exemplary embodiment, would approve the request, and email 1820 an approval token to the author.

Figure 18B:
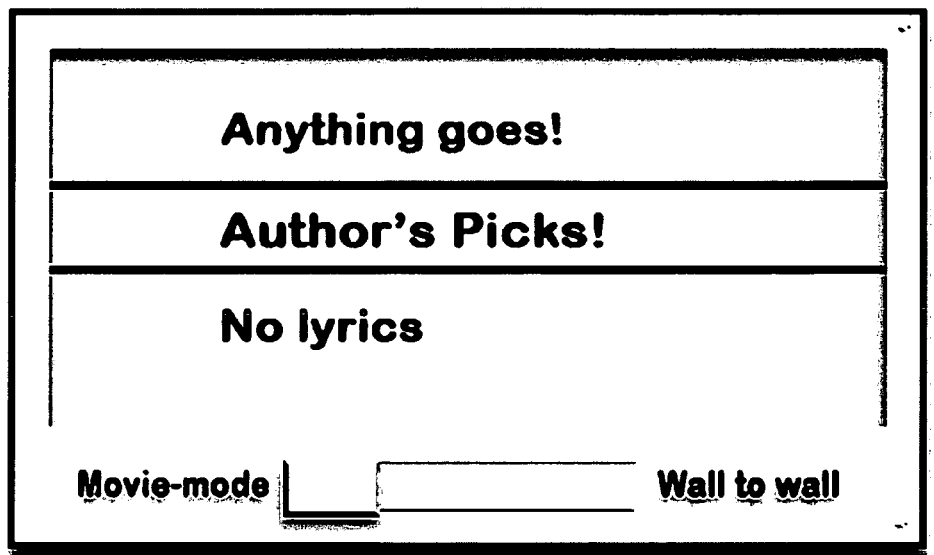
FIG. 18B depicts an exemplary view of an exemplary online selection screen for choosing an Author's Pick playlist.

According to an input of the approval token, the exemplary embodiment would facilitate an author launching 1830 the exemplary coordinated music identification playlist editor for their particular text work, and creating a charted playlist 1840 for their text work. The exemplary embodiment would facilitate the author entering the approval token and the author's charted playlist 1850 and would facilitate the author using the charted playlist name "Author's Picks" in conjunction with a listing for sale of a digital copy of the author's respective work of text. FIG. 18B depicts an exemplary view of an exemplary online selection screen for choosing an Author's Pick playlist.

Playing a Charted Playlist During a User Reading of a Digital Text File

As described further below, one way that a user would be able to read a digital text file with an exemplary charted playlist playing in the background would be for the user to navigate to the exemplary website using the user's digital text reading device and stay connected to the website during the reading. As will also be further described below, another way that a user would be able to read a digital text file with an exemplary charted playlist playing in the background would be for the user to download an exemplary downloadable version of an exemplary digital Reader (sometimes referred to herein as a "dReader" or an "eReader" (electronic Reader)).

Using an Exemplary Internet-Enabled Web Service

Figure 15A:
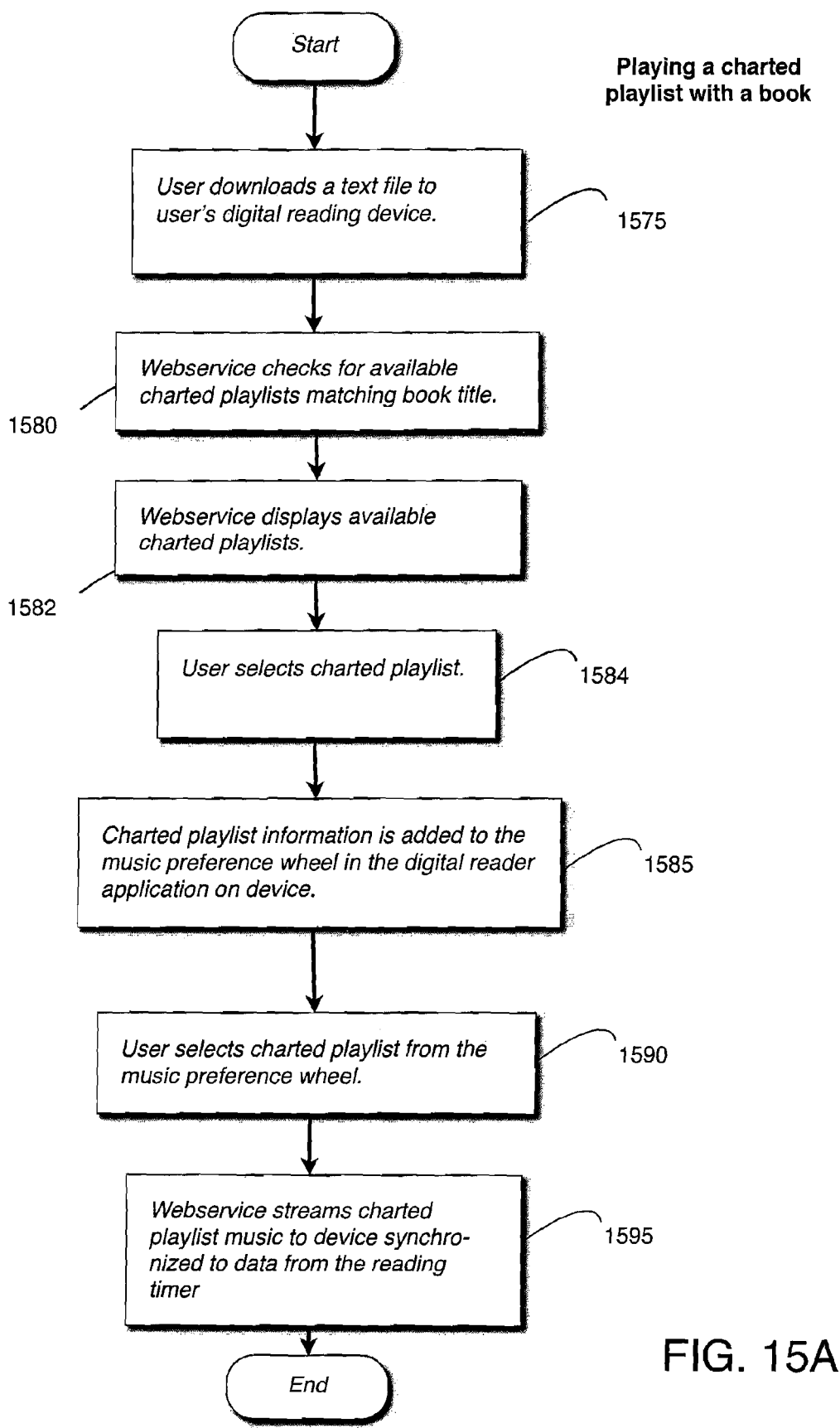
FIG. 15A depicts exemplary high level logic functions for a user to use such an exemplary Internet-Enabled Web Service for an online-connected reading of a digital text file in an exemplary embodiment of the present invention.

One way that a user would be able to read a digital text file with an exemplary charted playlist playing in the background would be for the user to navigate to the exemplary website using the user's digital text reading device (such as, by way of non-limiting example, any one of a number of types of computer devices, whether now known or in the future discovered, such as a wireless computer device, a tablet computer device, a specialized digital book reading device, or an intelligent phone). FIG. 15A depicts exemplary high level logic functions for a user to use such an exemplary Internet-Enabled Web Service for an online-connected reading of a digital text file.

In the exemplary embodiment depicted in FIG. 15A, before the user proceeds with the exemplary charted playlist web service, the user would download and install an exemplary digital reading application ("dReader") from the website to the user's computer device.

As depicted in FIG. 15A, once the user has entered the exemplary website, if the user wanted to read a text file, such as a book, that the user had not previously purchased, the exemplary website would provide an exemplary store front for the user to download the text file to the user's digital reading device 1575. Alternatively, (not shown), the user may already have previously obtained the text file, and merely want to read the text file with a charted playlist—in such case, the user would enter an identification of the text file, such as the title, so that the exemplary website could proceed with the process described below regarding element number 1580.

Once the user has identified the text file (such as by downloading 1575 the text file), the exemplary website would check 1580 for available charted playlists that had been posted for use for that particular text file. For example, the exemplary website (also sometimes referred to as the exemplary webservice) would check 1580 for available charted playlists matching the user-selected/user-input book title. The exemplary website would display 1582 to the user available charted playlists for the relevant text file. Displays of charted playlists could include, for example, an identity of the playlist creator, a list of works of music included in the charted playlist, and/or other information regarding the playlist. Displays of charted playlists could also, for example, identify ratings of each charted playlist by previous readers, and in some embodiments, a price for using the particular charted playlist.

In some exemplary embodiments, some charted playlists would be provided free of charge; other charted playlists would require payment of a fee for using the charted playlist. In some exemplary embodiments, for a charted playlist for which a fee is charged, a commission for a reading user selecting that charted playlist would be paid to the provider of the exemplary website.

The user would select 1584 from the display of available charted playlists, a particular charted playlist. The exemplary website would add 1585 the selected charted playlist and related information to an exemplary music preference wheel display (see, e.g., FIGS. 17B and 18B) in the previously-installed exemplary digital reader application on the user's computer device.

While still connected to the exemplary website, the user would select the charted playlist 1590 from the exemplary music preference wheel display (see, e.g., FIGS. 17B and 18B) 1590.

While still connected, but only as long as connected, to the exemplary website, the exemplary web service would stream 1595 charted playlist music to the user's device, synchronized to data from an exemplary reading timer communicated between the user's computer device and the exemplary website. As will be understood by someone with ordinary skill in the art, the exemplary reading timer would coordinate the user's reading time of the digital text file with music/sound selections in the selected charted playlist so that each music/sound selection in the selected charted playlist would be played during the user's reading of a segment of text in the digital text file to which the particular music/sound selection had been charted to be played.

Using a Downloadable Digital Reader for Offline Music/Sound Playback

The exemplary embodiment would provide an exemplary downloadable application (e.g., an exemplary mobile "app") for user digital reading devices that would facilitate offline sound playback of charted playlists during offline reading of a digital text file. For example, an exemplary charted playlist "app" icon would be provided that a user of a wireless mobile device could use to download and install an exemplary digital reader and charted playlist application for execution on the user's wireless mobile device for reading digital text works with synchronized playback of charted playlists.

Figure 15B:
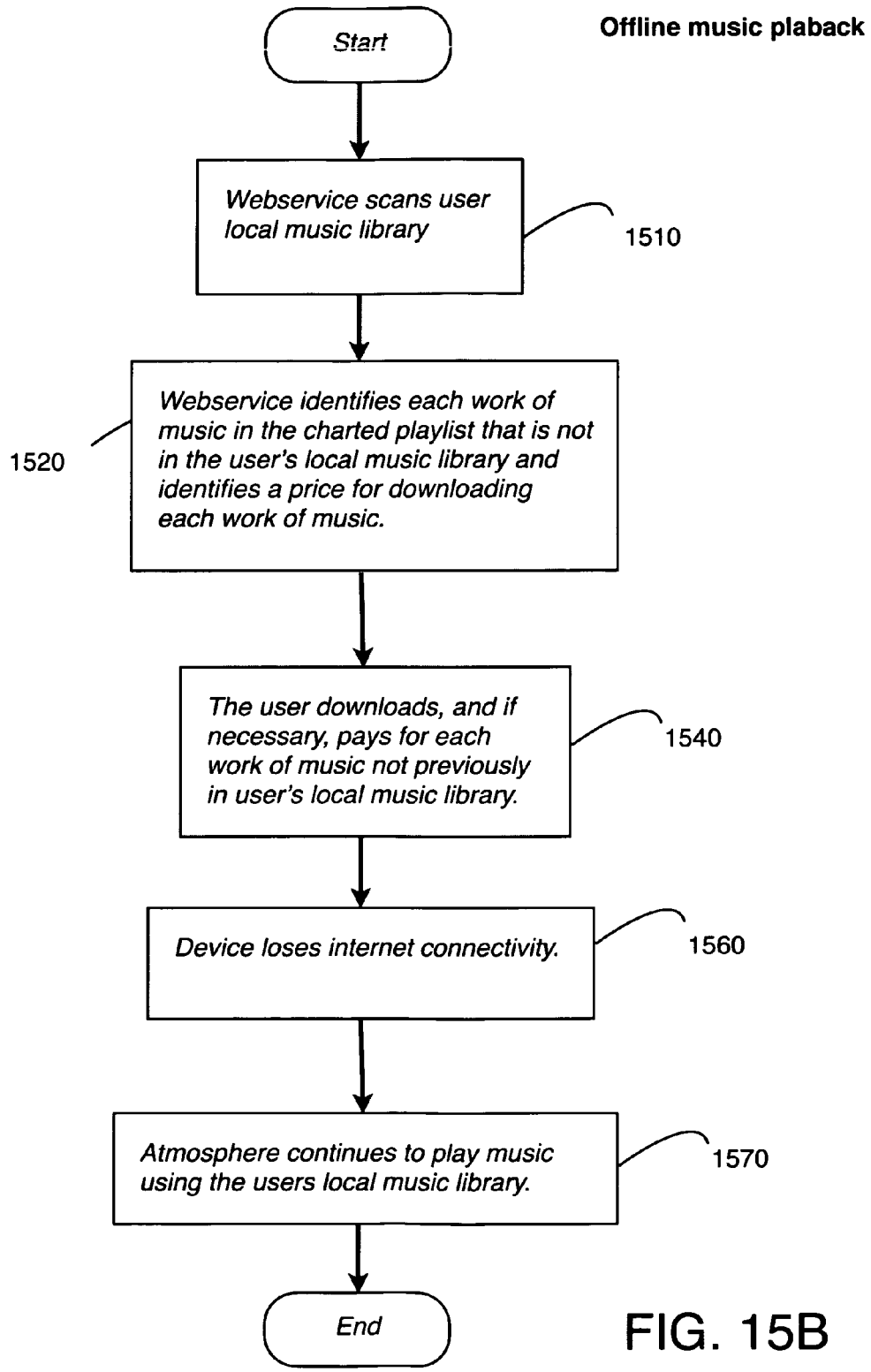
FIG. 15B depicts exemplary high-level logic functions for an exemplary downloadable digital reader and charted playlist application embodiment, to facilitate offline music playback of an exemplary playlist of works of music for an exemplary reading user's offline reading of an exemplary digital text file in an exemplary embodiment of the present invention.

FIG. 15B depicts exemplary high-level logic functions for an exemplary embodiment of an exemplary downloadable digital reader and charted playlist application embodiment, to facilitate offline music playback of an exemplary charted playlist of works of music for an exemplary reading user's offline reading of an exemplary digital text file in an exemplary embodiment of the present invention.

In one embodiment, in order to play charted playlists offline, the user would first download and install the exemplary downloadable digital reader and charted playlist application ("app") on the user's local computer device (such as, by way of non-limiting example, any one of a number of types of computer devices, whether now known or in the future discovered, such as a personal computer, a wireless computer device, a tablet computer device, a specialized digital book reading device, or an intelligent phone).

In one embodiment, in order to play charted playlists offline, the user would first access the exemplary website, similar to the manner described above regarding FIG. 15A, to identify and select a charted playlist. Once a charted playlist had been selected, as depicted in FIG. 15B, the exemplary embodiment would facilitate analyzing a user's personal music library on the user's local device to determine whether each particular work of music that is identified in the selected particular charted playlist for a particular text file is available in the user's personal music library that is stored on the user's local device.

In particular, as depicted in FIG. 15B, the exemplary embodiment would scan a reading user's personal music library 1510 stored on the user's local device for works of music that are identified in a charted playlist for a particular text file; the exemplary embodiment would check 1520 works of music identified in the reading user's personal music library stored on the user's local device against works of music or sound that are identified in the particular charted playlist. For a particular work of music that is identified as not being available in the reading user's personal music library stored on the user's local device but that is identified as being part of the particular charted playlist, then the exemplary embodiment would identify, such as by a display, the work of music and a price for downloading the work 1520 into a memory storage device accessible by the reading user's particular local computer device.

In order to be able to execute the charted playback of the charted playlist, the user would then 1540 download, and if necessary, pay for, each work of music or sound that had not previously been stored in the user's local music library.

As depicted in FIG. 15, even in the event that the user's particular device becomes disconnected from the Internet 1560, the user's particular device, on which an exemplary user-client embodiment of the present invention is installed and enabled, would continue 1570 to play music during the reading user's reading of the particular text file.

Implementation Alternatives and Considerations

As will be understood by someone with ordinary skill in the art, exemplary embodiments of the present invention, including an exemplary Internet-enabled website and a downloadable digital reader application, could be programmed using various programming languages, whether now known or in the future discovered. For example, an exemplary embodiment could be programmed using computer software languages such as PHP, MYSQL®, OPENGL® (OpenGL®), C+ and C++, among others.

As will be further understood by someone with ordinary skill in the art, the description herein of an exemplary website for performing the various exemplary Mood Analyzer and Charted Playlist creation functions of the present invention is illustrative and non-limiting. Rather, some exemplary embodiments would provide an exemplary downloadable Mood Analyzer applicationand/or an exemplary downloadable Charted Playlist Creation application.

Facsimile Reproduction of Copyright Material

A portion of the disclosure of this patent document contains material which is subject to copyright protection by the copyright owner, Phil I. Weinstein, and his successors and assigns. The copyright owner has no objection to the facsimile reproduction by anyone of the patent document or the patent disclosure, as it appears in the Patent and Trademark Office patent file or records, but otherwise reserves all copyright rights whatsoever.

Illustrative Embodiments

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A system for creating and sharing music and sound playlists synchronized with digital text, the system comprising:
 one or more processors; and logic encoded in one or more tangible non-transitory media for execution by the one or more processors and when executed operable to perform operations comprising:
 displaying one or more music selections and mood text segments in a text file to a user;
 enabling the user to specify one or more music selections for playback for the mood text segments based on a user-indication of a corresponding section of text in the text file during a later reading of which said selection of music should be played;
 making the first set of music selections synchronized with digital text available to at least one reading user on a device; and
 playing music selections synchronized with digital text while the at least one reading-user is reading the particular digital text file on a device.

2. The system of claim 1, wherein for said facilitating of said user specification, said at least one computer device being further programmed for:
 generating a graphic representation of a plurality of mood text segments in a text file.

3. The system of claim 2, wherein for said facilitating of said user specification, said at least one computer device being further programmed for:
 facilitating user specification of a plurality of music selections for user-specified corresponding playback for each respective mood text segment of said plurality of mood text segments.

4. The system of claim 1, wherein for facilitating at least a second reading user reading the particular digital text file in conjunction with said charted playback of said first set of music selections, said at least one computer device being further programmed for:
 in response to a later reading of said text file by a reading user, synchronizing playback of said plurality of music selections in correspondence with said later reading of each respective mood text segment of said plurality of mood text segments; and
 synchronizing said playback of said plurality of music sections according to an automatically determined reading speed by said reading user of said text file.

5. A non-transitory computer program product for creating and sharing music and sound playlists synchronized with digital text, said computer program product comprising executable computer program instructions recorded on an executable computer medium, said executable program instructions for:
 causing one or more music selections and mood text segments in a text file to be displayed to a user;
 enabling the user to specify one or more music selections for playback for the mood text segments based on a user-indication of a corresponding section of text in the text file during a later reading of which said selection of music should be played;
 generating a graphic representation of a plurality of mood text segments in a text file;
 making the first set of music selections synchronized with digital text available to at least one reading user; and
 playing music selections synchronized with digital text while the at least one reading-user is reading the particular digital text file.

6. The computer program product of claim 5, said computer program product comprising further executable computer program instructions for:
 facilitating user specification of a plurality of music selections for user-specified corresponding playback for each respective mood text segment of said plurality of mood text segments.

7. The computer program product of claim 6, said computer program product comprising further executable computer program instructions for:
 in response to a later reading of said text file by a reading user, synchronizing playback of said plurality of music sections in correspondence with said later reading of each respective mood text segment of said plurality of mood text segments.

8. The computer program product of claim 7, said computer program product comprising further executable computer program instructions for:
 synchronizing said playback of said plurality of music sections according to an automatically determined reading speed by said reading user of said text file.

9. The computer program product of claim 5, said computer program product comprising further executable computer program instructions for:
 automatically identifying each respective mood text segment of said plurality of mood text segments.

10. The computer program product of claim 5, said computer program product comprising further executable computer program instructions for:
 receiving a user-specification of an identification of each respective mood text segment of said plurality of mood text segments.

11. The computer program product of claim 5, wherein said graphic representation of said plurality of mood text segments in said text file comprises a color-coded graphic overlay on a display of said test file.

12. The computer program product of claim 5, wherein said graphic representation of said plurality of mood text segments in said text file comprises a color-coded graphic overlay on a display of said test file and a corresponding selectable, color-coded mood text segment indicator.

13. The computer program product of claim 5, said computer program product comprising further executable computer program instructions for:
 causing one or more music selections and mood text segments in a text file to be displayed to a user;
  enabling the user to specify one or more music selections for playback for the mood text segments based on a user-indication of a corresponding section of text in the text file during a later reading of which said selection of music should be played.

14. The computer program product of claim 9, said computer program product comprising further executable computer program instructions for:
 sharing with a plurality of users, said user specification of said plurality of music selections for said text file.

15. A method for user specification of music for creating and sharing music and sound playlists synchronized with digital text, using a computer system comprising at least one computer device programmed, alone or in conjunction with other computer devices, to:
- causing one or more music selections and mood text segments in a text file to be displayed to a user;
- enabling the user to specify one or more music selections for playback for the mood text segments based on a user-indication of a corresponding section of text in the text file during a later reading of which said selection of music should be played;
- making the first set of music selections synchronized with digital text available to at least one reading user; and
- playing music selections synchronized with digital text while the at least one reading-user is reading the particular digital text file.

16. The method of claim 15, said at least one computer device further programmed to:
- facilitate input of said user-identification of a set of music selections and a corresponding set of sections of said text file during a later reading of which said set of music selections should be correspondingly played.

* * * * *